United States Patent
Asjadi

(10) Patent No.: US 8,396,174 B2
(45) Date of Patent: Mar. 12, 2013

(54) DATA PROCESSING APPARATUS AND METHOD

(75) Inventor: Gholam Hosein Asjadi, Guildford (GB)

(73) Assignee: Sony Corporation, Tokyo (JP)

( * ) Notice: Subject to any disclaimer, the term of this patent is extended or adjusted under 35 U.S.C. 154(b) by 287 days.

(21) Appl. No.: 12/790,200

(22) Filed: May 28, 2010

(65) Prior Publication Data

US 2010/0309384 A1 Dec. 9, 2010

(30) Foreign Application Priority Data

Jun. 3, 2009 (GB) .................................. 0909590.2

(51) Int. Cl.
 H03D 1/00 (2006.01)
(52) U.S. Cl. ....................................... 375/343; 348/725
(58) Field of Classification Search .................. 348/725; 375/343, 350, 267; 370/350, 208, 210
See application file for complete search history.

(56) References Cited

U.S. PATENT DOCUMENTS

| | | | | |
|---|---|---|---|---|
| 6,246,735 | B1 * | 6/2001 | Sano et al. ..................... | 375/364 |
| 6,614,864 | B1 * | 9/2003 | Raphaeli et al. ............... | 375/371 |
| 6,795,423 | B1 * | 9/2004 | Sezgin et al. .................. | 370/342 |
| 6,836,518 | B1 * | 12/2004 | Sano et al. ..................... | 375/343 |
| 7,194,055 | B2 * | 3/2007 | Tandai et al. .................. | 375/368 |
| 7,203,718 | B1 * | 4/2007 | Fu et al. ......................... | 708/622 |
| 7,274,757 | B1 * | 9/2007 | Zhou et al. ..................... | 375/340 |
| 7,349,503 | B2 * | 3/2008 | Husted et al. .................. | 375/346 |
| 7,457,295 | B2 * | 11/2008 | Saunders et al. ......... | 370/395.21 |
| 7,463,704 | B1 * | 12/2008 | Tehrani et al. ................. | 375/345 |
| 7,522,669 | B2 * | 4/2009 | Husted et al. .................. | 375/252 |
| 7,577,218 | B2 * | 8/2009 | Kim et al. ...................... | 375/343 |
| 7,720,106 | B2 * | 5/2010 | Zhou .............................. | 370/503 |
| 7,852,972 | B2 * | 12/2010 | Wallace et al. ................ | 375/340 |
| 7,860,193 | B2 * | 12/2010 | Gupta ............................ | 375/340 |
| 8,085,814 | B2 * | 12/2011 | Ma et al. ........................ | 370/473 |
| 8,139,614 | B2 * | 3/2012 | Razazian et al. .............. | 370/503 |
| 2002/0126220 | A1 * | 9/2002 | Wilson et al. .................. | 348/518 |
| 2002/0183027 | A1 * | 12/2002 | Husted et al. .................. | 455/219 |

(Continued)

FOREIGN PATENT DOCUMENTS

EP 2200205 A1 * 6/2010

OTHER PUBLICATIONS

U.S. Appl. No. 12/783,245, filed May 19, 2010, Asjadi.

(Continued)

*Primary Examiner* — David Ometz
*Assistant Examiner* — Bahman Badipour
(74) *Attorney, Agent, or Firm* — Oblon, Spivak, McClelland, Maier & Neustadt, L.L.P.

(57) ABSTRACT

A receiver for recovering data from Orthogonal Frequency Division Multiplexed (OFDM) symbols. The receiver includes a signalling and guard detector, which includes a correlator comprising a first branch having a first moving averaging filter, which is arranged to form pre-amble average correlated samples by averaging a value of a plurality of pre-amble correlated samples within a moving window, the plurality of samples averaged within the moving window corresponding to a temporal length of the post-amble (Tb), a second branch having a second moving averaging filter, which forms post-amble average correlated samples by averaging a value of a plurality of post-amble correlated samples within a moving window, the plurality of samples averaged within the moving window corresponding to a temporal length of the pre-amble (Tc), a combiner, which combines the averaged pre-amble correlated samples and the averaged post-amble correlated samples to form output correlation samples.

20 Claims, 21 Drawing Sheets

U.S. PATENT DOCUMENTS

| | | | |
|---|---|---|---|
| 2003/0012313 A1* | 1/2003 | Husted et al. | 375/345 |
| 2004/0005018 A1 | 1/2004 | Zhu et al. | |
| 2005/0063297 A1* | 3/2005 | Sakata et al. | 370/208 |
| 2006/0126491 A1* | 6/2006 | Ro et al. | 370/208 |
| 2007/0092044 A1 | 4/2007 | Wang et al. | |
| 2007/0147336 A1* | 6/2007 | Lee et al. | 370/350 |
| 2007/0230602 A1* | 10/2007 | Sato | 375/260 |
| 2007/0264950 A1* | 11/2007 | Husted et al. | 455/136 |
| 2008/0037458 A1* | 2/2008 | Myszne | 370/319 |
| 2008/0170645 A1 | 7/2008 | Kleider et al. | |
| 2008/0181346 A1* | 7/2008 | Jang | 375/359 |
| 2008/0212563 A1* | 9/2008 | Birru | 370/350 |
| 2009/0168930 A1* | 7/2009 | Li et al. | 375/346 |
| 2009/0180525 A1* | 7/2009 | Kobayashi et al. | 375/150 |
| 2009/0225822 A1* | 9/2009 | Tupala et al. | 375/226 |
| 2009/0290664 A1* | 11/2009 | Walton et al. | 375/344 |
| 2009/0295632 A1* | 12/2009 | Simic et al. | 342/357.12 |
| 2010/0002817 A1* | 1/2010 | Vrcelj et al. | 375/354 |
| 2010/0142659 A1* | 6/2010 | Gold-Gavriely et al. | 375/343 |
| 2010/0208712 A1* | 8/2010 | Wax et al. | 370/338 |
| 2010/0310022 A1* | 12/2010 | Asjadi | 375/343 |

OTHER PUBLICATIONS

Jonathan Stott, "The PI Symbol", DTG DVB-T2 Implementers' Seminar, www.dtg.org.uk/dtg/t2docs/P1_Jonathon_Stott_BBC.pdf, Oct. 9, 2008, pp. 1-16.

Chin-Liang Wang, et al., "An Optimized Joint Time Synchronization and Channel Estimation Scheme for OFDM Systems", 2008 IEEE $67^{th}$ Vehicular Technology Conference, May 11-14, 2008, pp. 908-912.

* cited by examiner

The L1 Signalling Structure [1]

The P1 Symbol Structure for 8 MHz System [1]

Active Carriers of the P1 Symbol for 8 MHz System [1]

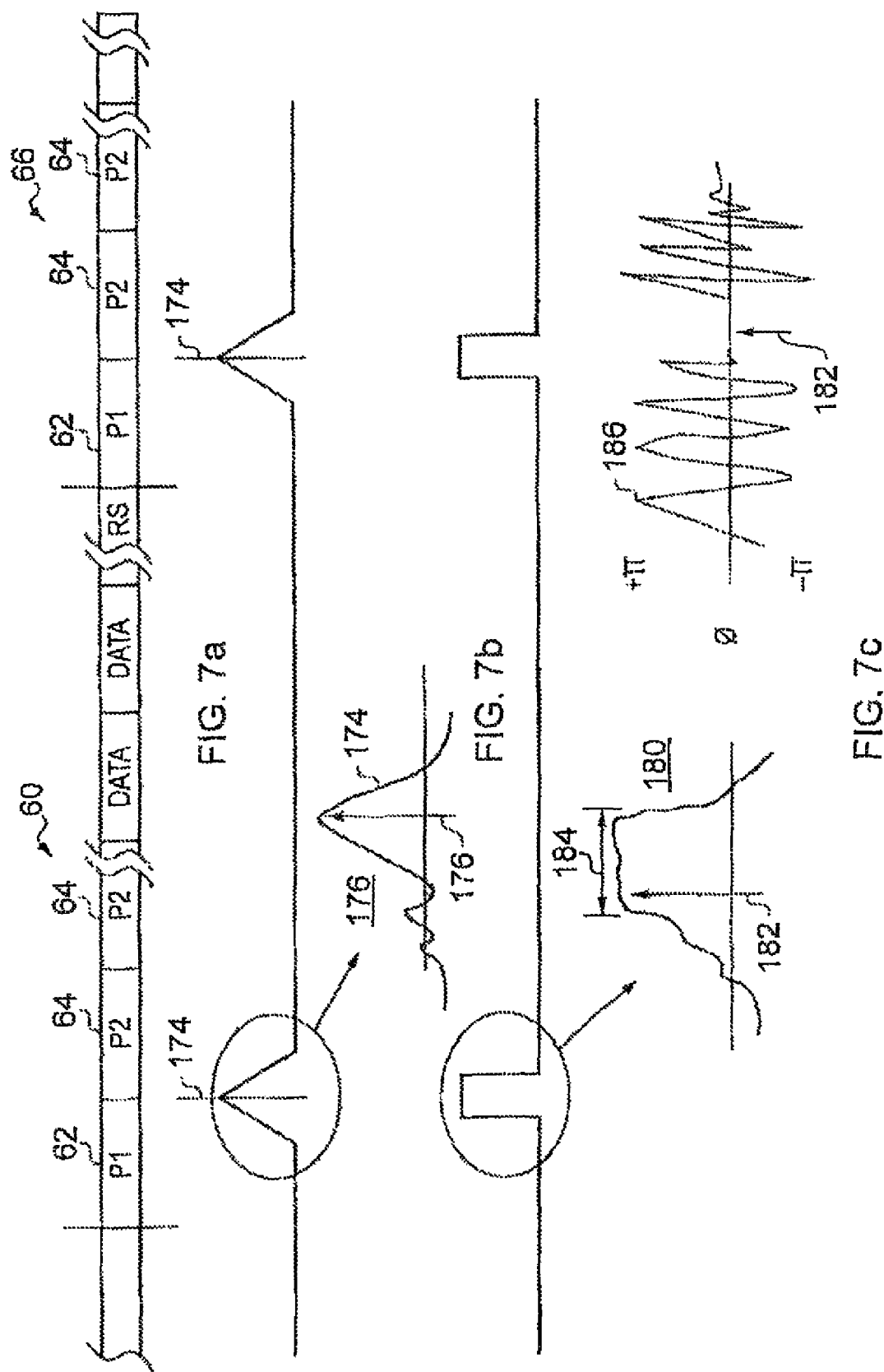

'IG' Method: Correlation for the P1 Detection [2]

'IG' Method of P1 Detection [2]

Architecture of Adaptive Threshold Computation

Final Architecture: Computation of P1 Detection Flag and Estimated Phase

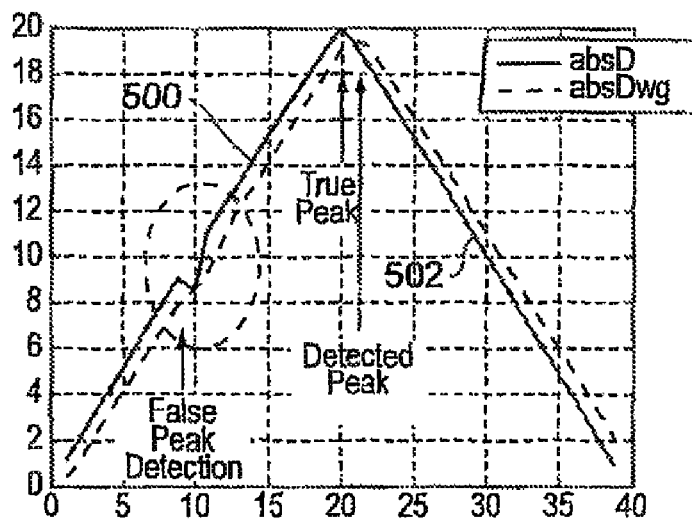
FIG. 16
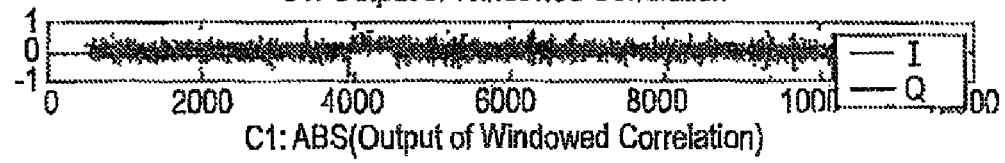
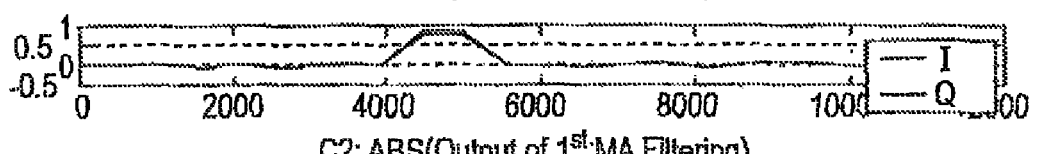
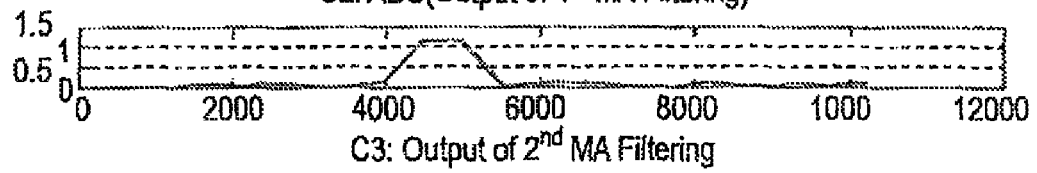
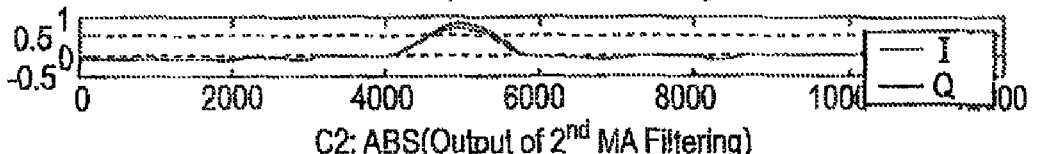
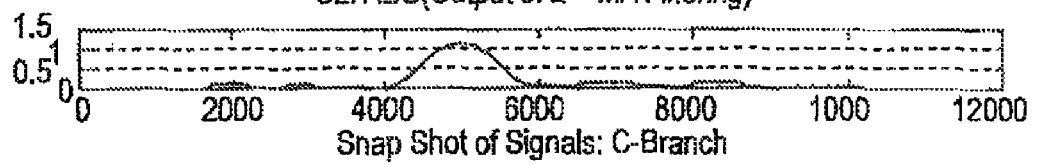
FIG. 17

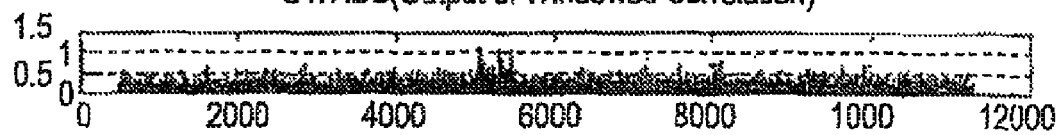
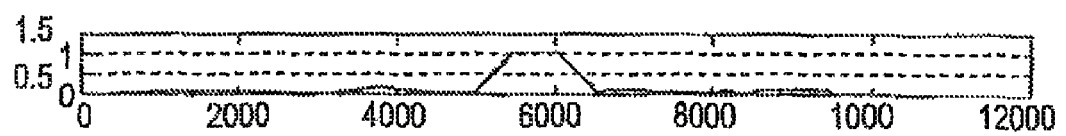
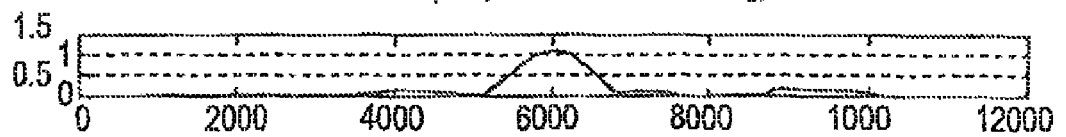
Snap Shot of Signals: B-Branch
FIG. 18

Snap Shot of Signals: 'abs_D', 'Adaptive Threshold' and 'Detected Flag'

Snap Shot of Signals - First P1 Symbol Detection

Argument of Signal 'D' for Test Case: SNR = 33 dB, 'Signal Path'

Position Accuracy for 3-Path Channel

Reliability Curve for 3-Path Channel

Phase estimation for 3-Path Channel

Position Estimation for 3-Path Channel

Reliability Curve for single Path Channel

Phase estimation for Single Path Channel

Phase estimation for Single Path Channel

DATA PROCESSING APPARATUS AND METHOD

FIELD OF INVENTION

The present invention relates to receivers and methods for detecting and recovering data from Orthogonal Frequency Division Multiplexed (OFDM) symbols, which include within a repeating time frame a signalling OFDM symbol and one or more data bearing OFDM symbols.

BACKGROUND OF THE INVENTION

There are many examples of radio communications systems in which data is communicated using Orthogonal Frequency Division Multiplexing (OFDM). Systems which have been arranged to operate in accordance with Digital Video Broadcasting (DVB) standards for example, utilise OFDM. OFDM can be generally described as providing K narrow band sub-carriers (where K is an integer) which are modulated in parallel, each sub-carrier communicating a modulated data symbol such as Quadrature Amplitude Modulated (QAM) symbol or Quadrature Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period, which can be longer than a coherence time of the radio channel. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols.

To facilitate detection and recovery of the data at a receiver, some communications systems which utilise OFDM include a signalling OFDM symbol to provide signalling information and also to provide a facility for detecting a timing of a time divided frame, which is subsequently repeated. The time divided frame may include the signalling OFDM symbol and data bearing OFDM symbols at predetermined positions within the frame, which is then repeated in the next and subsequent frames. Accordingly, by detecting the signalling OFDM symbol, a receiver can synchronise with the repeating pattern of the OFDM symbols within the frames and therefore correctly identify data bearing OFDM symbols at predetermined positions in the frame.

Signalling OFDM symbols are designed to facilitate detection of the signalling OFDM symbols by a receiver. For the example of DVB-T2, as described in Digital Video Broadcasting (DVB); Frame structure, channel coding and modulation for a second generation digital terrestrial television broadcasting system (DVB-T2)", Draft ETSI EN 302 755, Version 1.1.1-0.2, October 2008, a P1 signalling OFDM symbol is arranged to include a pre-amble guard interval and a post-amble guard interval, the pre-amble and the post-amble guard intervals being formed by copying samples from a useful part of the signalling OFDM symbol. A recommended technique for detecting the P1 OFDM symbol is disclosed in "Digital Video Broadcasting (DVB); Implementation guidelines for a second generation digital terrestrial television broadcasting system (DVB-T2)", Draft ETSI TR 102 831, Version 0.7.6, September 2008.

Although designed to facilitate detection at receiver, detecting a signalling OFDM symbol at a receiver in the presence of typical transmission disturbances such as multipath, additive white Gaussian noise and analogue interference (modelled by the continuous wave interference) can present a technical problem.

SUMMARY OF INVENTION

According to an aspect of the present invention there is provided a receiver for detecting and recovering data from Orthogonal Frequency Division Multiplexed (OFDM) symbols. The OFDM symbols include within a repeating time frame a signalling OFDM symbol and one or more data bearing OFDM symbols, the signalling OFDM symbol including a pre-amble guard interval and a post-amble guard interval, the pre-amble and the post-amble guard intervals being formed by copying samples from a useful part of the signalling OFDM symbol in the time domain. The receiver includes a demodulator which is arranged in operation to detect a signal representing the OFDM symbols and to generate a sampled version of the OFDM symbols in the time domain, and a signalling and guard detector. The signalling and guard detector includes a correlator comprising a first branch which forms pre-amble correlated samples from the pre-amble of the signalling OFDM symbol, and includes a first moving averaging filter, which is arranged to form pre-amble average correlated samples by averaging a value of a plurality of the pre-amble correlated samples within a moving window, the plurality of samples averaged within the moving window corresponding to a temporal length of the post-amble (Tb), and a second branch which forms post-able correlated samples from the post-amble of the signalling OFDM symbol, and includes a second moving averaging filter, which is arranged to form post-amble average correlated samples by averaging a value of a plurality of the post-amble correlated samples within a moving window, the plurality of samples averaged within the moving window corresponding to a temporal length of the pre-amble (Tc), a combiner, which is arranged to combine the averaged pre-amble correlated samples and the averaged post-amble correlated samples to form output correlation samples, and a post processing detector which is arranged to detect the signalling OFDM symbol from the output correlation samples to identify a timing of the frame from which the data bearing OFDM symbols can be identified.

Embodiments of the present invention can provide an accurate technique for signalling information from an OFDM symbol which includes a guard interval as both a pre-amble and a post-amble, such as the presence of a P1 symbol, P1 position and fine frequency offset estimation. The P1 symbol maybe arranged in accordance with the DVB-T2 standard. The correlator has a first branch which forms pre-amble correlated samples by correlating the samples from the pre-amble and a second branch which forms post-amble correlated samples by correlating the samples from the post-amble In each of these first and second branches a moving averaging filter is included which is matched to a temporal length of the post-amble and pre-amble guard intervals respectively. That is, the temporal length of the moving averaging filter in respective of a number of samples which are averaged to form an average sample within a sliding window corresponds to a temporal length of the 'guard interval' (similar to guard intervals but they are split shifted copies of part A) processed by the other of the two branches. As a result, it has been found that the output correlation samples provide a better defined peak in the presence of typical disturbances, which are present at the receiver. As such an accuracy with which a timing or synchronisation point can be identified from the signalling OFDM symbol can be improved, which thereby improves the integrity of the recovered data by improving the accuracy with which the OFDM symbols and their position in the frame can be identified.

Furthermore, in other example embodiments a post processor receives output correlation samples formed from the combined post- and pre-amble correlation output samples from the correlator and adapts a threshold for detecting the synchronisation point representing a point at which the signalling OFDM symbol has been deemed to have been detected. As a combination the technique of including the moving averaging filter in each branch matched to the guard interval for the pre- and post-amble respectively of the opposite branch, and the adaptive threshold detection performed by the post processor provides an improvement for accurately and reliably assessing the detection of the signalling OFDM symbol, which can therefore be used to more reliably and accurately improve the integrity of the receiver and therefore the recovered data. Moreover, the scheme provides improved performance when estimating the fine frequency offset values.

Further aspects and features of the present invention are defined in the appended claims and explained in the following description of example embodiments.

In some embodiments the OFDM symbols are transmitted in accordance with a Digital Video Broadcasting standard, such as DVB-T, DVB-T2, DVB-H or DVB-C2.

Further aspects of the present invention include a method recovering data from Orthogonal Frequency Division Multiplexed (OFDM) symbols.

BRIEF DESCRIPTION OF DRAWINGS

Embodiments of the present invention will now be described by way of example only with reference to the accompanying drawings in which like parts are identified by the same numerical designations and in which:

FIG. 7a is a schematic block diagram of a plurality of super-frames of the DVB-T2 standard; FIG. 7b is an illustrative plot of correlation amplitude with respect to time when correlating for the P1 symbol for the ideal case; and FIG. 7c is an illustrative plot of signal amplitude with respect to time for a more typical reception environment;

FIG. 16 is an example plot of signal amplitude with respect to time for both an absolute value of a correlation output and an absolute value of the correlation output averaged over a plurality of samples to resolve false peak-picking;

FIG. 17 is a schematic graphical representation of a plot of signal value with respect to time for several of the signals appearing within the correlator shown in FIG. 11;

FIG. 18 shows a corresponding plot corresponding to that shown in FIG. 17 but for a different branch of the correlator;

DESCRIPTION OF PREFERRED EMBODIMENTS

Example embodiments of the present invention are described in the following paragraphs with reference to a receiver operating in accordance with the DVB-T2 standard, although it will be appreciated that embodiments of the present invention find application with other DVB standards and indeed other communications systems which utilise OFDM. The OFDM systems may used radio to communicate the OFDM symbols at the physical layer or other physical media such as cable.

Figure 1:
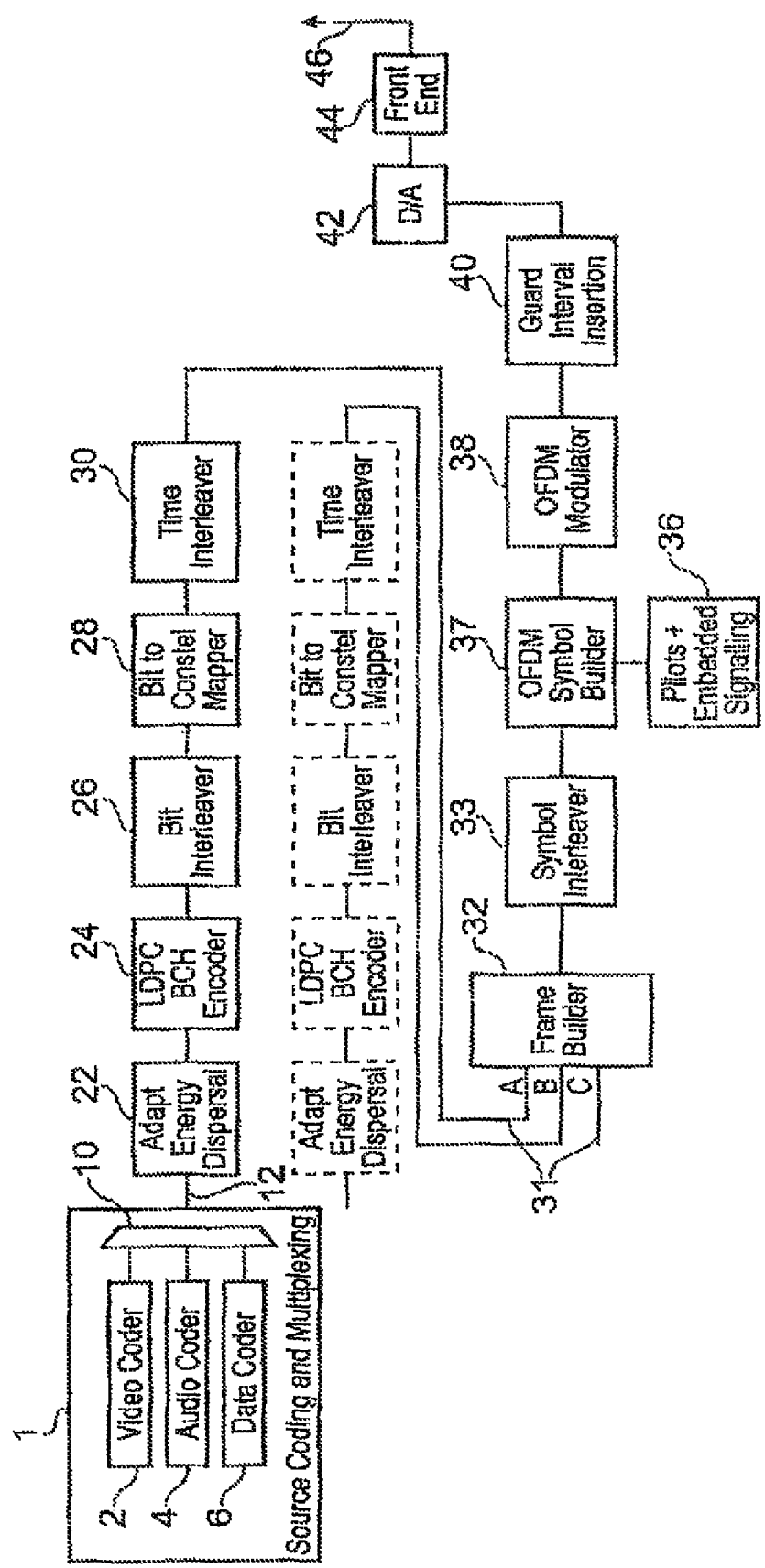
FIG. 1 is a schematic block diagram of an OFDM transmitter which may be used, for example, with the DVB-T2 standard.

FIG. 1 provides an example block diagram of an OFDM transmitter which may be used for example to transmit video images and audio signals in accordance with the DVB-T, DVB-H, DVB-T2 or DVB-C2 standard. In FIG. 1 a program source generates data to be transmitted by the OFDM transmitter. A video coder 2, and audio coder 4 and a data coder 6 generate video, audio and other data to be transmitted which are fed to a program multiplexer 10. The output of the program multiplexer 10 forms a multiplexed stream with other information required to communicate the video, audio and other data. The multiplexer 10 provides a stream on a connecting channel 12. There may be many such multiplexed streams which are fed into different branches A, B etc. For simplicity, only branch A will be described.

As shown in FIG. 1 an OFDM transmitter 20 receives the stream at a multiplexer adaptation and energy dispersal block 22. The multiplexer adaptation and energy dispersal block 22 randomizes the data and feeds the appropriate data to a forward error correction encoder 24 which performs error correction encoding of the stream. A bit interleaver 26 is provided to interleave the encoded data bits which for the example of DVB-T2 is the LDCP/BCH encoder output. The output from the bit interleaver 26 is fed to a bit into constellation mapper 28, which maps groups of bits onto a constellation point of a modulation scheme, which is to be used for conveying the encoded data bits. The outputs from the bit into constellation mapper 28 are constellation point labels that represent real and imaginary components. The constellation point labels represent data symbols formed from two or more bits depending on the modulation scheme used. These can be referred to as data cells. These data cells are passed through a time-interleaver 30 whose effect is to interleave data cells resulting from multiple LDPC code words.

The data cells are received by a frame builder 32, with data cells produced by branch B etc in FIG. 1, via other channels 31. The frame builder 32 then forms many data cells into sequences to be conveyed on OFDM symbols, where an OFDM symbol comprises a number of data cells, each data cell being mapped onto one of the sub-carriers. The number of sub-carriers will depend on the mode of operation of the system, which may include one of 1 k, 2 k, 4 k, 8 k, 16 k or 32 k, each of which provides a different number of sub-carriers according, for example to the following table:

| Maximum Number of Sub-carriers per mode. | |
|---|---|
| Mode | Data Sub-carriers |
| 1K | 853 |
| 2K | 1705 |
| 4K | 3409 |
| 8K | 6913 |
| 16K | 13921 |
| 32K | 27841 |

The sequence of data cells to be carried in each OFDM symbol is then passed to the symbol interleaver 33. The OFDM symbol is then generated by an OFDM symbol builder block 37 which introduces pilot and synchronising signals fed from a pilot and embedded signal former 36. An OFDM modulator 38 then forms the OFDM symbol in the time domain which is fed to a guard insertion processor 40 for generating a guard interval between symbols, and then to a digital to analogue convertor 42 and finally to an RF amplifier within an RF front end 44 for eventual broadcast by the OFDM transmitter from an antenna 46.

Frame Format

Figure 2:
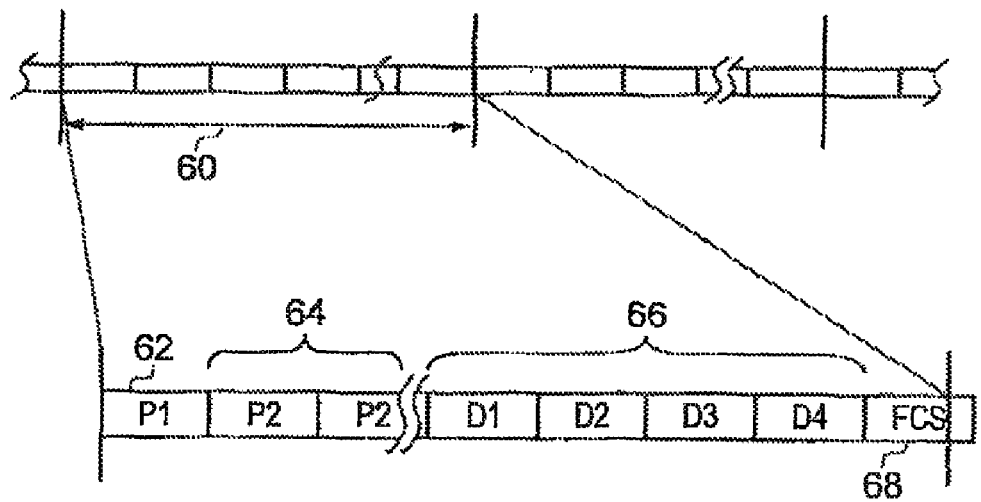
FIG. 2 is an example illustration of a super frame structure according to the DVB-T2 standard.

For the DVB-T2 system, the number of sub-carriers per OFDM symbol can vary depending upon the number of pilot and other reserved carriers. An example illustration of a "super frame" according to the DVB-T2 standard is shown in FIG. 2.

Thus, in DVB-T2, unlike in DVB-T, the number of sub-carriers for carrying data is not fixed. Broadcasters can select one of the operating modes from 1 k, 2 k, 4 k, 8 k, 16 k, 32 k each providing a range of sub-carriers for data per OFDM symbol, the maximum available for each of these modes being 1024, 2048, 4096, 8192, 16384, 32768 respectively. In DVB-T2 a physical layer frame is composed of many OFDM symbols. Typically the frame starts with a preamble or P1 symbol as shown in FIG. 2, which provides signalling information relating to the configuration of the DVB-T2 deployment, including an indication of the mode. The P1 symbol is followed by one or more P2 OFDM symbols 64, which are then followed by a number of payload carrying OFDM symbols 66. The end of the physical layer frame is marked by a frame closing symbols (FCS) 68. For each operating mode, the number of sub-carriers may be different for each type of symbol. Furthermore, the number of sub-carriers may vary for each according to whether bandwidth extension is selected, whether tone reservation is enabled and according to which pilot sub-carrier pattern has been selected. As such a generalisation to a specific number of sub-carriers per OFDM symbol is difficult.

Receiver

Figure 3:
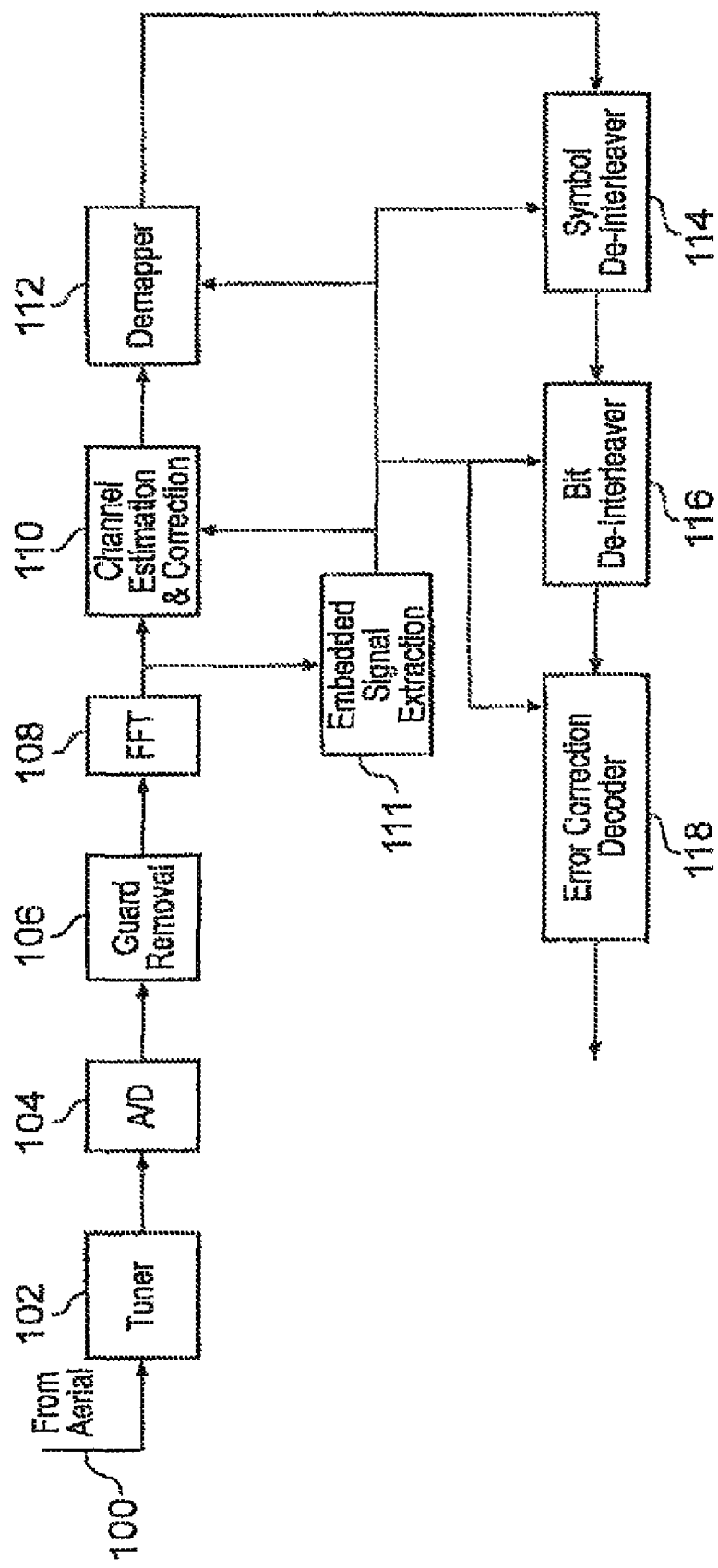
FIG. 3 is a schematic block diagram of an OFDM receiver which may be used, for example, with the DVB-T or DVB-T2 standard.

FIG. 3 provides an example illustration of a receiver which may be used with the present technique. As shown in FIG. 3, an OFDM signal is received by an antenna 100 and detected by a tuner 102 and converted into digital form by an analogue-to-digital converter 104. A guard interval removal processor 106 removes the guard interval from a received OFDM symbol, before the data is recovered from the OFDM symbol using a Fast Fourier Transform (FFT) processor 108 in combination with a channel estimator and corrector 110 and an embedded-signalling decoding unit 111. The demodulated data is recovered from a de-mapper 112 and fed to a symbol de-interleaver 114, which operates to effect a reverse mapping of the received data symbol to re-generate an output data stream with the data de-interleaved. Similarly, the bit de-interleaver 116 reverses the bit interleaving performed by the bit interleaver 26. The remaining parts of the OFDM receiver shown in FIG. 3 are provided to effect error correction decoding 118 to correct errors and recover an estimate of the source data.

P1 Symbol in DVB-T2

Embodiments of the present invention find application with detecting a signalling OFDM symbol such as that which might be used to acquire synchronisation and detection of a frame structure of a communication system, such as, for example, the P1 OFDM symbol of the DVB-T2 system.

Figure 4:
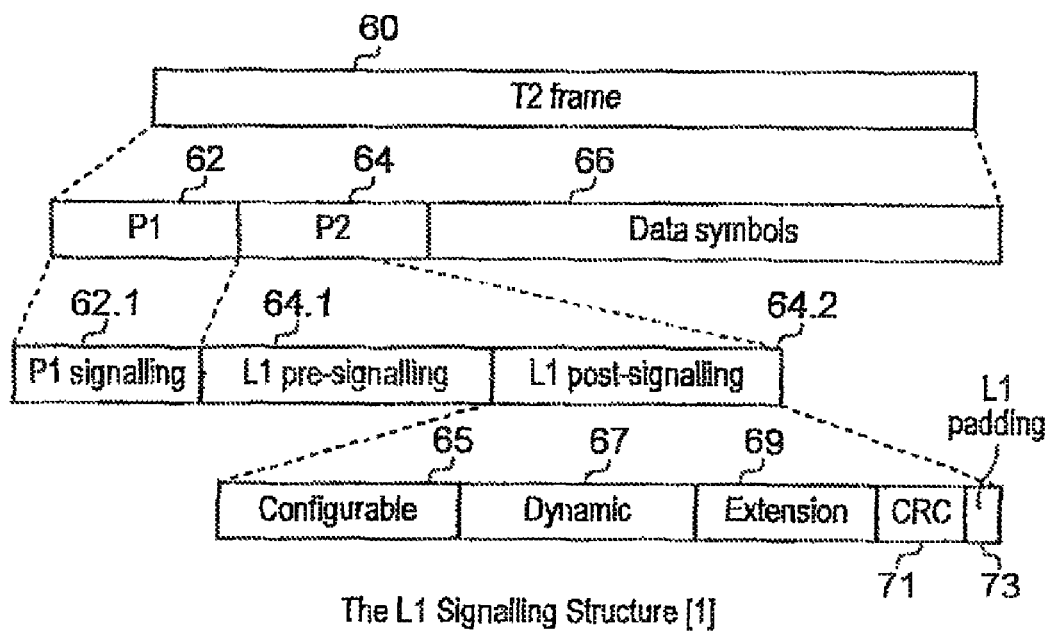
FIG. 4 is a schematic block diagram illustrating a P1 signalling OFDM symbol which is generated as part of the DVB-T2 standard.

According to the DVB-T2 standard, the start of the frame of repeating OFDM symbols is signaled by a short P1 symbol, as illustrated in FIG. 4. The information carried by the P1 symbol includes a 7 bit data field of two types: the first type (associated to the S1 bits of the P1) is needed to distinguish the preamble format (and hence, the frame type); the second type helps the receiver to rapidly characterize the basic transmission parameters. Tables 1, 2 and 3 below summarize the signaling carried by P1 symbol according to what is specified for the DVB-T2 standard as disclosed in Digital Video Broadcasting (DVB); Frame structure, channel coding and modulation for a second generation digital terrestrial television broadcasting system (DVB-T2)", Draft ETSI EN 302 755, Version 1.1.1-0.2, October 2008.

TABLE 1

P1 Signalling: S1 Field [1]

| S1 | Preamble Format/P2 Type | Description |
|---|---|---|
| 000 | T2_SISO | The preamble is a T2 preamble and the P2 part is transmitted in its SISO format |
| 001 | T2_MISO | The preamble is a T2 preamble and the P2 part is transmitted in its MISO format |
| 010 | Reserved | These combinations may be used for future systems, including a system containing both T2-frames and FEF parts, as well as future systems not defined in the present document |
| 011 | | |
| 100 | | |
| 101 | | |
| 110 | | |
| 111 | | |

TABLE 2

P1 Signalling: S2 Field 1 (for T2 preamble types, S1 = 00x) [1]

| S1 | S2 | FFT/GI size | Description |
|---|---|---|---|
| 00X | 000X | FFT Size: 2K - any guard interval | Indicates the FFT size and guard interval of the symbols in the T2-frame |
| 00X | 001X | FFT Size: 8K - guard intervals $1/32$; $1/16$; $1/8$ or $1/4$ | |
| 00X | 010X | FFT Size: 4K - any guard interval | |
| 00X | 011X | FFT Size: 1K - any guard interval | |
| 00X | 100X | FFT Size: 16K - any guard interval | |
| 00X | 101X | FFT Size: 32K - guard intervals $1/32$; $1/16$; $1/8$ or $1/4$ | |
| 00X | 110X | FFT Size: 8K - guard intervals $1/128$; $19/256$ or $19/128$ | |
| 00X | 111X | FFT Size: 32K - guard intervals $1/128$; $19/256$ or $19/128$ | |

TABLE 3

P1 Signaling: S2 Field 2 [1]

| S1 | S2 | Meaning | Description |
|---|---|---|---|
| XXX | XXX0 | Not mixed | All preambles in the current transmission are of the same type as this preamble. |
| XXX | XXX1 | Mixed | Preambles of different types are transmitted including at least one T2 preamble (S1 field = 00x) in every super-frame. |

The P1 symbol is carefully structured to provide a simple and robust mechanism for rapid detection of DVB-T2 signal as well as fast frequency lock mechanism (fine and coarse frequency offsets).

A recommendation is provided in "Digital Video Broadcasting (DVB); Implementation guidelines for a second generation digital terrestrial television broadcasting system (DVB-T2)", Draft ETSI TR 102 831, Version 0.7.6, September 2008, for P1 detection. However, as will be explained, the recommended detection techniques can produce a sub-optimal performance in some reception environments.

The P1 symbol has four main purposes, which are:
to enable the receiver to determine quickly (e.g. during a band scan at a new location) whether a particular RF channel contains a DVB-T2 signal. (If it does not, then it can move on to try another channel, or check the same one for other services, e.g. DVB-T).
to identify the preamble itself as a T2 preamble. (Note that a signal may contain both T2 frames and Future Extension Frame (FEF) periods.)
to signal some transmission parameters that are needed to decode the rest of the preamble and subsequently the main payload. In particular, the P1 discloses the FFT mode of the transmission. Although the guard interval of the transmission is still unknown and has to be ascertained, the reduction in the number of possibilities is useful to decrease the detection time.
to enable the receiver to detect and correct frequency and timing synchronization.

The architecture of the P1 symbol has been designed to be robust, enabling the receiver to decode the P1 symbol in challenging conditions, with a minimum overhead. P1 for DVB-T2 was therefore designed with the following features:

1. Protection against interference: It is expected that the P1 symbol can be correctly received and decoded under extremely adverse circumstances. The choice (for efficiency) of a fixed, short length for P1 means that inter-symbol interference may occur, but can be tolerated since the modulation and coding is designed to operate at very low signal-to-noise ratio. (The length of the left-portion C added to the main 1K symbol A is not enough to absorb completely the response of the channel to the previous data symbol (see FIG. 5 described shortly)).

The presence of the two portions C and B at the beginning and end of the 1K symbol improves robustness against both false detection and loss of detection which might otherwise occur in the presence of long-delayed echoes of the channel (even of opposite sign) or spurious signals (like continuous wave interferers).

2. Reception without any knowledge of the channel: Owing to its carrier distribution, the P1 can be correctly recovered when the receiver is tuned to the nominal centre frequency. In fact, the symbol supports offsets of up to ±500 kHz from the centre of the bandwidth in the case of 8 MHz systems. The Peak to Average Power Ratio (PAPR) of the symbol has been optimized in order to make its reception better, even if any AGC loops are not yet stable.

3. Offset-correction capabilities: Within the initialization tasks, the P1 symbol can be used to gain coarse time synchronization of the receiver, as well as to detect (and then correct) any frequency deviation, for both fractional and whole-carrier shifts, from its nominal centre bandwidth.

4. Robustness of signaling: The signaling that is conveyed within the P1 is DBPSK modulated. It has been ensured that this protection is enough to recover the P1 signaling information even under negative values of SNR.

Structure of the P1 Symbol

The P1 symbol (2048 sample long) is based on a 1K OFDM symbol with frequency shifted repeats at the front and rear of the symbol. The total symbol lasts 224 μs in 8 MHz system, comprising useful part 'A' (1024 samples) plus two 'guard like interval' sections 'C' (542 samples) and 'B' (482 samples). From 853 useful carriers of 1K symbol, only 384 are used (starting at carrier 44 and ending at carrier 809), leaving others set to zero. The used carriers occupy roughly 6.83 MHz band from the middle of the nominal 7.61 MHz signal bandwidth. The design of the symbol is such that even with a maximum frequency offset of 500 KHz, most of the active carriers remain within the 7.61 MHz bandwidth. As such the P1 symbol can still be recovered in the presence of substantial frequency offsets. However, optimisation of the detection of the P1 symbol remains a technical problem.

Detection of the P1 Symbol

As will be explained in the following paragraphs, the present technique provides for a reliable and robust detection of the P1 symbol which is a signalling symbol of an OFDM symbol for example that use within the DVB-T2.

As shown in FIG. 4, the DVB-T2 frame 60 includes a P1 symbol 62 and a P2 symbol 64 as well as other OFDM symbols 66 for carrying data. However, further to the illustration shown in FIG. 2, FIG. 4 provides an illustration of the L1 signalling data structure which is provided by the P1 and P2 62, 64 symbols. As shown in FIG. 4, the P1 symbol 62 includes P1 signalling data 62.1 whereas the P2 symbol 64 includes in two parts L1 signalling data which is provided in a pre-signal 64.1 and a post-signal 64.2. The L1 post signalling data is shown to provide several data fields inducing configurable data 65, a dynamic field 67, an extension field 69 and a cyclic redundancy check field 71 as well as palming symbols 73.

The present technique provides an arrangement for detecting accurately a timing of the super frame structure by detecting the presence of the P1 symbol. The P1 symbol provides the FFT size of the OFDM symbols in the DVB-T2 symbol stream. As such, detection of the P1 symbol reliably is a pre-requisite for correctly detecting the remaining part of the DVB-T2 symbol stream. To this end, the P1 symbol stream is provided with a pre- and post-amble guard interval as illustrated in FIG. 5.

Figure 5:
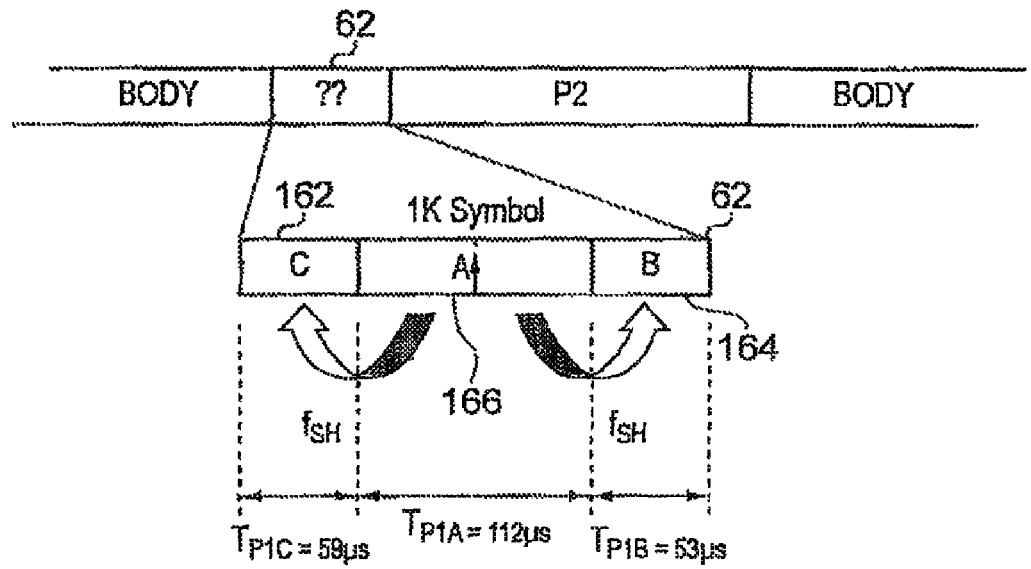
FIG. 5 is a schematic block diagram illustrating the guard pre-amble and post-amble intervals of the P1 symbol of the DVB-T2 standard.

As shown in FIG. 5 and as explained above, the P1 symbol 62 includes a pre-amble guard interval 162 and a post-amble guard 164. The pre- and post-amble guard intervals are formed by copying and cyclically shifting samples within the useful part of the burst 166 represented as portion A. In FIG. 5, the post-amble guard interval is labelled "B" and the pre-amble guard interval is labelled "C". As illustrated in FIG. 5, as well as copying the symbol samples from the useful part of the burst A, 166, there is also a phase rotation introduced of $f_{SH}$. As well as the post-amble and pre-amble guard intervals, the P1 symbol also includes a reduced number of active carriers in order to increase a likelihood of correctly detecting the P1 symbol.

Figure 6:
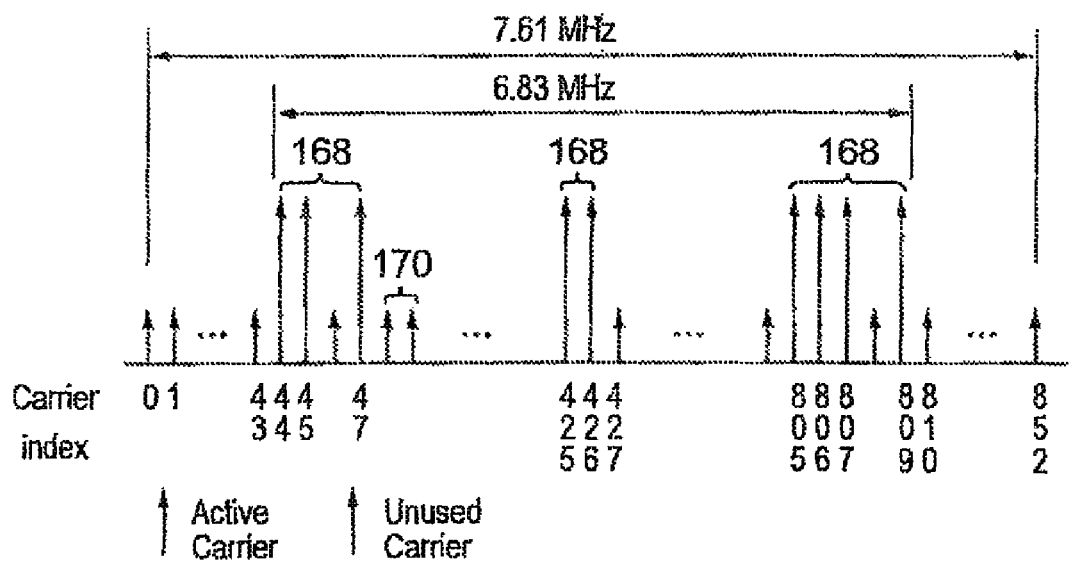
FIG. 6 is a schematic illustration of active carriers of the P1 symbol.

FIG. 6 illustrates carriers within a 6.83 megahertz bandwidth compared to a total bandwidth of 7.61 megahertz. Thus the active carriers 168 compare with unused carriers which are shown with a smaller height 170.

The P1 processing can be thought of as comprising into two tasks, which are detection and validation. The P1 detection aims to achieve the following:

Detect the presence of a P1 symbol
Set a reference for coarse time synchronization
Set an argument used to correct fractional (±0.5 carrier spacing) frequency offsets.

The P1 validation provides the following information:

It confirms that the 1K symbol received is a P1 symbol. This implies that the power in the frequency domain is distributed in accordance with the distribution sequence specified for the P1 symbol.

It reports and corrects the integer number of carriers offset where the distribution of the power has been localized.

According to the present technique, the signal and guard detector is arranged to cross-correlate the post- and pre-amble guard intervals with the samples from the useful part (A) of the OFDM symbol in order to generate a synchronisation flag with respect to which the timing for the other OFDM symbols within the super-frame can be identified. FIG. 7*a* illustrates two example super-frames 60 corresponding to that shown in FIG. 2, with the P1 and P2 symbols 62 and 64. According to the implementation guidelines, by cross-correlating the post-amble and pre-amble guard intervals, a correlation output signal amplitude plot with respect to time is obtained as shown in FIG. 7*b*. Thus, ideally a peak in the correlation value coincides with the end of the P1 symbol. Since the P1 symbol also provides the FFT size, it will be appreciated that having identified the end of the P1 symbol, the rest of the OFDM symbols within the super-frame can be correspondingly located within the super-frame. Thus, in FIG. 7*b*, an expanded view of each of the example correlation output values 174 is shown as a magnified view 176 again for an ideal case. Accordingly, it will be appreciated that for this example it will be relatively straight forward to identify an optimum timing point for the end of the P1 symbol 176. However, in reality, the stream of OFDM symbols according to the DVB-T2 standard will be received in the presence of analogue interference, additive white Gaussian noise as well as multi path. As such, in reality an output of a correlation in accordance with a conventional correlator as implemented according to the implementation guidelines could be for example as shown in FIG. 7*c* which corresponds to the examples shown in FIG. 7*b*, providing a plot of signal sample values with respect to time. As can be seen in FIG. 7*c*, the presence of multi path and noise has an effect of distorting the correlation value with the effect that example plots 178 no longer have a clearly defined maximum value from which the synchronisation of the P1 symbol can derive. Thus as shown in an expanded view 180, a sampling point illustrating the centre of the P1 symbol 182 could be within a range of values 184.

As well as identifying the correct position of the P1 symbol, the correlated timing derived from the P1 symbol is also used to identify the fine frequency offset providing a phase offset to ensure that the OFDM symbol falls within a frequency band of the receiver. Thus the timing interval 182 also provides the point at which the phase offset is identified as illustrated by a further plot 186 of phase with respect to time or sample number. As illustrated in FIG. 7*c*, a timing point 182 will identify the fine frequency offset in the received signal samples, which can therefore later be used within the detector to adjust the frequency domain location of the received sub-carrier signals of the OFDM symbols.

The present technique therefore aims to solve the technical problem of identifying as accurately as possible an optimum synchronisation point for the end of the P1 symbol, in the presence of typical disturbances such as additive white Gaussian noise, continuous wave interference and multi path. A solution will be explained in the following paragraphs.

P1 Detector According to the Implementation Guidelines

Figure 9:
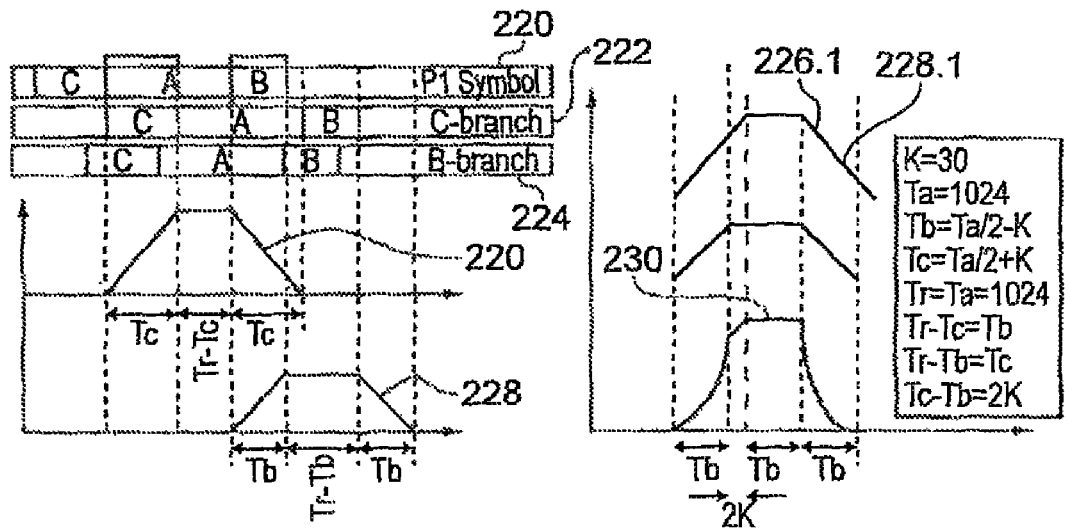
FIG. 9 provides a plurality of plots of signal amplitude with respect to time and showing the correlation functions within the respective branches of the correlator shown is FIG. 8.
Figure 8:
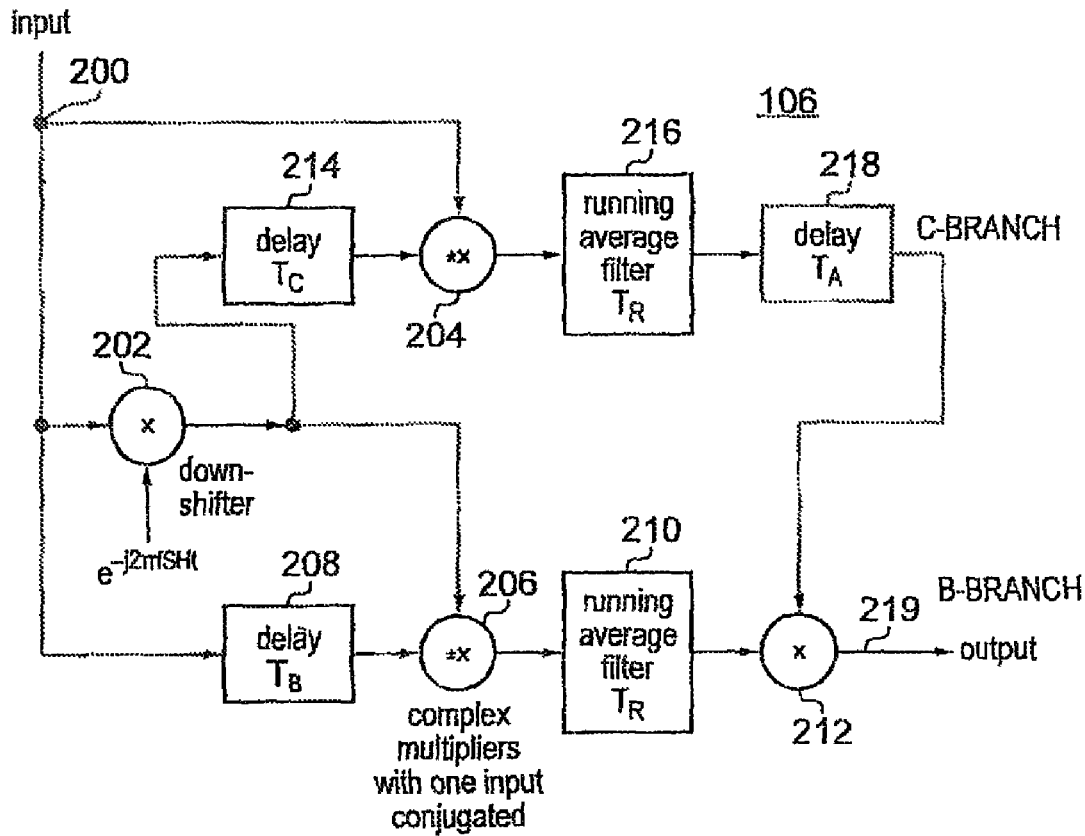
FIG. 8 is a schematic block diagram of a correlator which might be used within a guard and signalling detector within a receiver for a DVB-T2 standard according to the implementation guidelines.

FIG. 8 provides an example illustration of a correlator for detecting P1 symbol according to the DVB-T2 implementation guidelines provided in "Digital Video Broadcasting (DVB); Implementation guidelines for a second generation digital terrestrial television broadcasting system (DVB-T2)", Draft ETSI TR 102 831, Version 0.7.6, September 2008. As shown in FIG. 5, the 'C' and 'B' segments are frequency-shifted repeats of parts of 'A' and therefore the reverse needs to be performed at the receiver. FIG. 9 shows a possible scenario for the P1 detection based on modified windowed correlation specified in the implementation guidelines.

As shown in FIG. 8, an input of the guard and signalling detector 106 from the analogue to digital converter 104 is provided on a channel 200 which feeds respective signal samples to a first input of respective multipliers 202, 204. A second input to the first multiplier receives a phase offset which downshifts the received signal samples by $2\pi f_{SH}$ to counter the phase rotation provided when the post-amble B was formed as illustrated in FIG. 5. The output from the first multiplier 202 is then fed to a third multiplier 206. A second input to the third multiplier 206 receives the input signal samples but delayed by a delay element 208, by an amount equal to the length of the post-amble TB. Thus the third multiplier forms a correlation output correlating the signal samples of the P1 symbol on a first branch with respect to the post-amble because the signal samples are delayed by an amount TB. The signal samples received at the second input are conjugated to provide a conventional correlation multiplication.

An output of the third multiplier 206 is then fed to a running average filter 210, which averages over a duration at TR, an output of which is fed to a first input of a final multiplier 212. A second input to the final multiplier 212 is provided by the second upper branch which forms correlation output for the pre-amble guard period TC. Accordingly, to a second input of the second multiplier 204 is signal samples are received from the output of the down shifted input signal samples 202 via a second delay element 214 which is set to delay the received signal sample values by an amount equal to the post-amble guard interval period TC. The delayed signal sample values are fed to the second input of the second multiplier 204 with the conjugation value being applied in order to form at the output of the second multiplier 204 a correlation sample value. For the upper part of the correlator shown in FIG. 8 a further running average filter 216 is provided, which again averages samples over a window period TR. The output of the running average filter 216 is then fed to the second input to the final multiplier 212 via a further delay element 218, which delays the signal samples by an amount which is equal to the duration of the useful part of the P1 symbols TA.

In FIG. 8, the frequency shift $f_{SH}$ is the frequency shift applied to the sections C and B of the P1 symbol at the transmitter, and corresponds to the carrier spacing of the 1K OFDM symbol that comprises section A of the P1. $T_A$, $T_B$ and $T_C$ correspond to 1024, 482 and 542 samples respectively, the lengths of the sections A, B and C of the P1 symbol.

The delay elements $T_C$ and $T_B$, together with an associated multiplier and running-average filter, each form part of a circuit (loosely called a 'correlator') which detects the frequency-shifted repetition in the signal in parts C and B respectively. The delay element $T_A$ makes the outputs of these two 'correlator' line up in time.

$T_R$ is chosen to be the reciprocal of $f_{SH}$ and thus corresponds to 1024 sample periods, the same as $T_A$. This choice interacts with the specified $f_{SH}$ in such a way as to eliminate unwanted complex constant terms at the outputs of the two correlators which might otherwise be caused by continuous wave interference or certain other unwanted correlation conditions.

With this choice of $T_R$, the 'correlator' outputs, for a simple Gaussian channel, are complex pulses whose magnitude is a trapezoidal pulse of base width $(T_A+T_X)$, sloping sides of duration $T_X$, and top of width $(T_A-T_X)$, where $T_X$ takes the value $T_C$ or $T_B$ respectively for the two correlator, as illustrated in FIG. 8. The running averaging filter in the upper and lower branches 216, 210 is arranged to average the signal samples over a duration of a period TR, which is equal to an expected duration of a continuous wave interference value so that over the period of that continuous wave, the interference sums to zero.

The argument of the correlator outputs of both branches contain information about the fine frequency offset, but also the unknown arbitrary phase (with respect to the transmitter) of the down-shifter oscillator. By multiplying the two correlator pulses as shown, the effect of the unknown arbitrary phase is cancelled. The argument of the final output pulse can be shown to be proportional to the 'fine' component of the frequency offset.

FIG. 9 illustrates the operation of the correlator for the implementation guidelines shown in FIG. 8 for a perfect channel without the presence of additive white Gaussian noise, continuous wave interference and multi path. In FIG. 9, the effect of the relative timing of the P1 symbol 220 is shown for the upper branch C 222 and the lower branch B 224. An effect of the output of multiplier 204 for branch C is shown from a plot of signal sample value with a respect to time 226 for the upper branch C and the lower branch B 228. The output value plot for the upper and lower branch are also represented superimposed in a second plot 226.1, 228.1 as they would appear after being delayed by the delay element 218 and when combined together by the final multiplier 212 a further plot 230 is produced.

When performing pulse detection or peak detection in the correlator output 219 to identify the end of the P1 symbol, an accurate threshold needs to be set to avoid false detections. In severe channel conditions, with multi-path and high levels of AWGN noise present, the final output of the P1 detection block would be considerably different from what has been shown in FIGS. 7b and 9.

Figure 10:
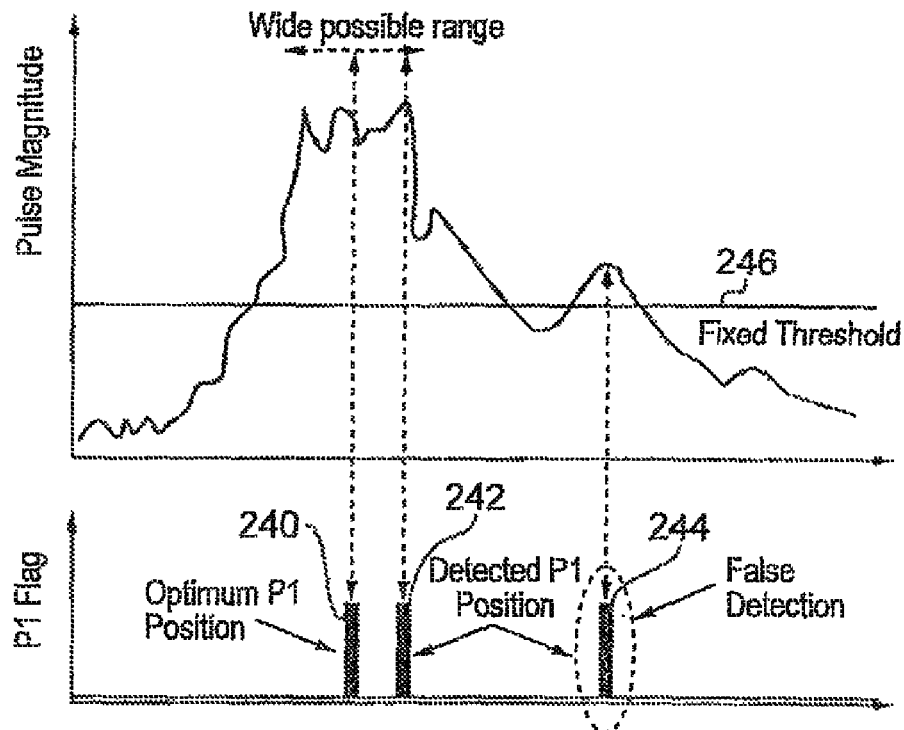
FIG. 10 is a pictorial representation showing a graphical plot of possible correlation magnitude with respect to time at an output of a correlator of FIG. 8 aligned with a plot of a detection flag against time when channel artifacts are present.

FIG. 10 depicts a possible false detection scenario as result of using fixed threshold and 'noisy output'. As illustrated by FIG. 10 which shows a more typical plot of output values signal samples with respect to time, there are several possible points which could be identified as the 'correct position' of the P1 symbol. As such, it will be appreciated that a false detection for the centre of the P1 symbol can be caused. Thus, in the second plot in FIG. 10 a detection flag is shown with respect to time. As illustrated by a flag position 240, which provides an optimum detection point there are two other possible detection values, both of which will be regarded as false detection points 242, 244. The present technique addresses this possible false detection location. As illustrated in FIG. 10, the false detection is partly caused by the fixed threshold value 246, which could therefore contribute to an ambiguity in the detection of the end of the P1 symbol 246.

Having regard to the above analysis, two enhancements of the implementation guideline method are proposed without altering the fundamental characteristics of the P1 structure. These are:

Positioning: Increasing P1 position accuracy by narrowing down the wide possible range, Detection: Reducing false detections by means of adaptive threshold.

Example Detector According to the Present Technique

Figure 11:
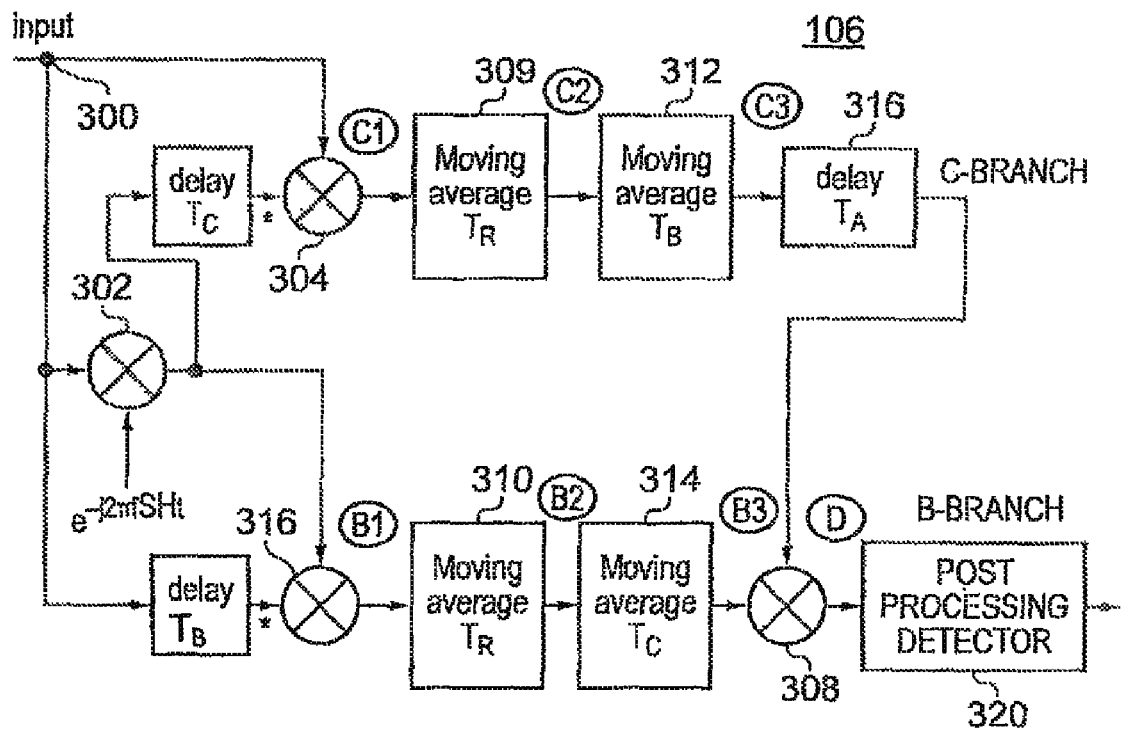
FIG. 11 is a schematic block diagram of a correlator which forms part of a signalling and P1 detector in accordance with present technique.
Figure 12:
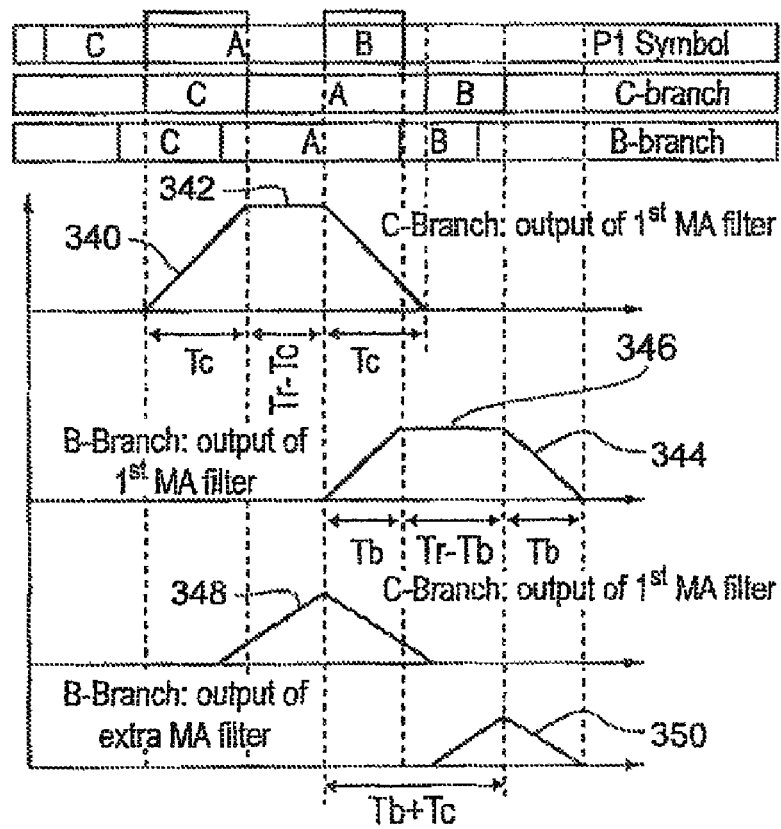
FIG. 12 is a schematic plot illustrating a correlation value with respect to time in each of the respective branches of the correlator shown in FIG. 11
Figure 13:
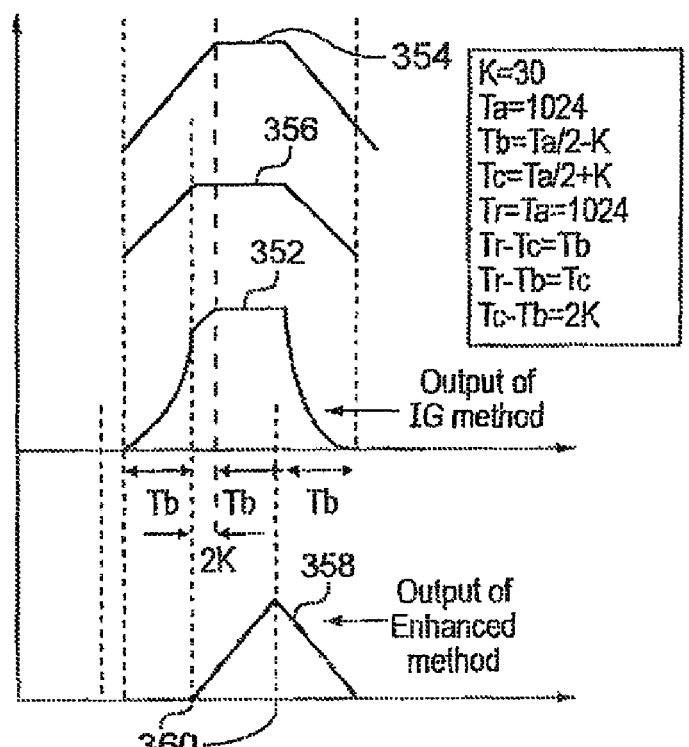
FIG. 13 shows a corresponding plot with the branches aligned and their outputs combined.

FIG. 11 shows an embodiment of the present technique, which can significantly reduce a large spread of P1 positioning ambiguity, which can occur, for the example of FIG. 10, as experienced in noisy and multi-path channels, by turning a trapezoidal pulse shape of the correlator output into a triangular shaped pulse. FIGS. 12 and 13 provide a pictorial description of how this is achieved.

As illustrated in FIG. 11, the correlator according to the present technique corresponds substantially to that provided in FIG. 9 according to the implementation guidelines. However in FIG. 11, there are four multipliers 302, 304, 306, 308 which receive signal samples from an input 300 of the guard and signalling detector 106. As for example illustrated in FIG. 9, the first multiplier 302 multiplies the received signal samples from the input channel 300 by a complex phase shift corresponding to the phase rotation $f_{SH}$ by providing at a second input of the first multiplier 302, a complex value $2\pi f_{SH}$. An output of the first multiplier is fed to the first and second branches. Again, as for FIG. 9, at the upper branch C the time delay of TC is introduced for a conjugate value of the signal samples is fed to a second input of the second multiplier 304 which forms correlation with the received signal samples from the channel 300. Correspondingly, on the lower branch after being delayed by a time delay TB the signal samples received from the channel 300 are conjugated and multiplied by the third multiplier 106 by the output from the first multiplier 302. For the upper and lower branches the outputs from the second and third multipliers 304, 306 are fed to respective running averaging filters 309, 310 which serve to average the signal samples over the continuous wave period TR.

According to the present technique, an output in the respective branches at points labelled C2, B2 are fed to a further moving averaging filter 312, 314 which serves to respectively average the signal sample values by an amount equal to the corresponding duration of the post- and pre-amble guard intervals TB, TC. The outputs from respective branches are then combined by the final multiplier 308 after the upper C branch is delayed by a value of TA by delay element 316 as for the example shown in FIG. 8.

Also shown in FIG. 11 is a post processing detector 320 which is used to detect the optimum detection point for the P1 symbol.

An effect of the additional moving averaging filters in the upper branch C and the lower B branch is illustrated in FIGS. 12 and 13. Effectively, by further averaging the output of the correlators, the correlation value produced provides a more accurate peak in value therefore improving a likelihood of correctly detecting the optimum synchronisation point of the P1 symbol. Thus, as shown in FIG. 13 from a plot 340, which provides an output of the first moving averaging filter a flat portion 342 is provided. For a second plot 344 there is also a flat portion 346, thereby providing some ambiguity in the optimum sampling point. However, the effects of the extra moving averaging filter in the C branch and the B branch is provided by the plots 348, 350 and clearly provide a maximum value and therefore an optimum detection point.

As shown in FIG. 13, for comparison an output of a conventional correlator according to the implementation guidelines 352 is shown which is formed from the outputs of conventional branches of the correlator shown in FIG. 8 for the upper branch C 354 and the lower B branch 356. In contrast, the final output of the multiplier 308 is illustrated by a plot 358 to have a single optimum detection point value 360.

Thus according to the present technique, the further moving averaging filters matched to the opposite branch post- or pre-amble guard for period has an effect of producing an optimum sample point. Therefore a likelihood of correctly detecting optimum timing according to the P1 symbol is improved. As explained above, the two correlation magnitudes of the first moving averaging filters, from both C- and B-branch produce a trapezoidal pulse shaped. However, two extra moving averaging filters, $T_b$ and $T_c$ long for C- and B-branch respectively, are added. The two extra filters have an effect of turning the trapezoidal pulses into triangular pulses which after applying appropriate delay, $T_A=1024$, and multiplication would result in a final triangular pulse.

It should be noted that the first two moving averaging filters 309, 310, are 1024 samples long, and remain the same in order to be able to retain a capability to reject continuous wave interference.

With a triangular pulse, the peak-picking would result in searching a much narrower range and thus a much smaller spread. The exact spread for different channel conditions is investigated and recorded in the next section after running long iterative simulations.

Once a peak is detected, the detection flag is set high. To avoid 'bouncing' a timer is set running during which no peak search takes place. The estimated phase is the argument of the extra moving averaging filter output (in case of the first enhancement) or final multiplier output (in case of deploying the second proposed enhancement) at the peak value.

As an added bonus, the extra moving averaging filters 312, 314 clean up the noisy correlation signal, thus resulting in more accurate phase estimation i.e. more accurate fine frequency offset.

Post Processing to Adapt Detection Threshold

To minimize false detections, ideally down to zero possibility, the threshold needs to be set adaptively. This is achieved using the post processor 320.

Figure 14:
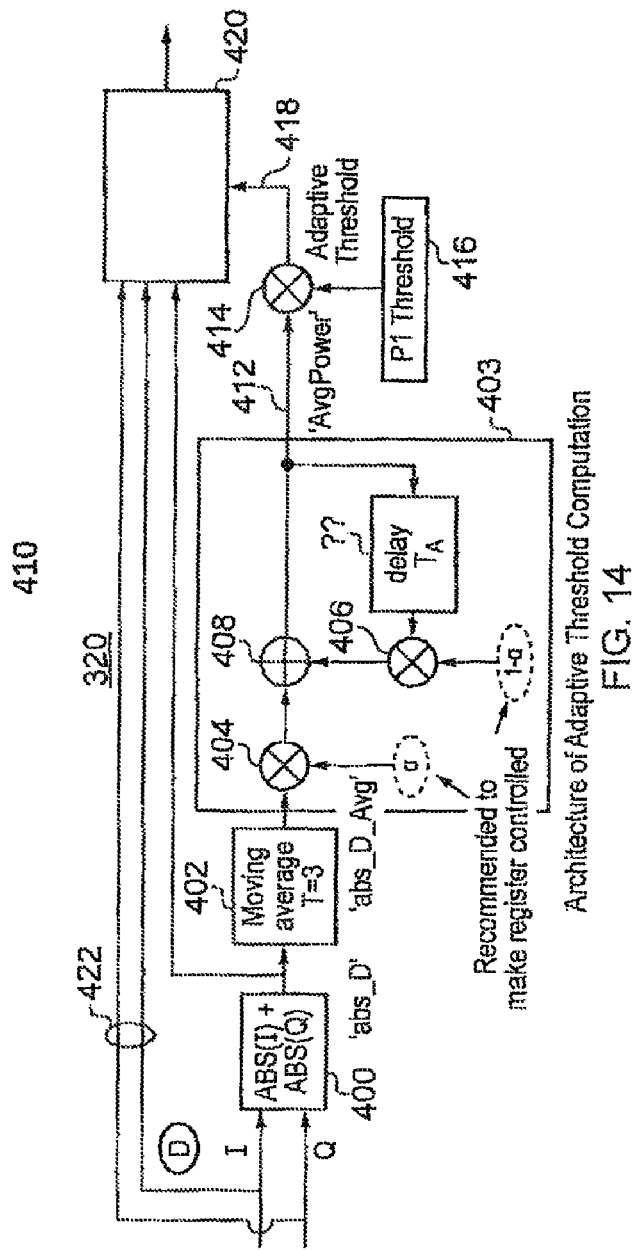
FIG. 14 is a schematic block diagram illustrating a post processor which receives an output of the correlator and generates the P1 detection flag using an adaptive threshold.
Figure 15:
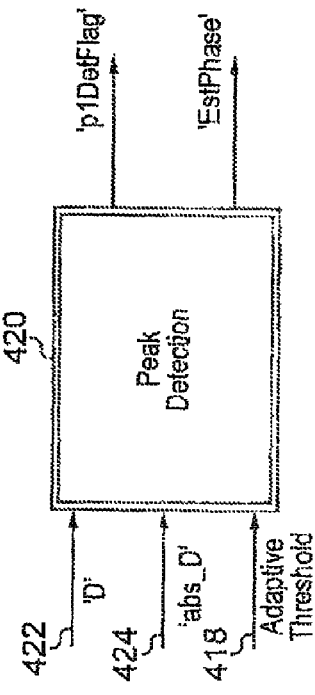
FIG. 15 is a schematic illustration of a peak detection component appearing in FIG. 14.

The post processor 320 is illustrated in more detail in FIGS. 14 and 15. Effectively, the post processor provides an improvement in the detection point in the presence of multi path and additive white Gaussian noise. This is because the post processor 320 serves to generate a variable threshold value for detecting the P1 symbol. Referring to FIG. 14, the I and Q components at the output from the final multiplier 308 from FIG. 11 are fed to an absolute I and Q difference calculator 400, which forms at its output an absolute magnitude of a combination of the I and Q components of each sample. The absolute magnitude of each sample is then fed to a moving averaging filter with a time period of three samples 402. The output from the moving averaging filter 402 is then fed to a leaky bucket filter 403 comprising two multipliers 404, 406 an adder 408 and a delay element 410, which delays the samples fed back from the output of the adder 408 by a value of equal to one sample. To a second input of each of the multipliers 404, 406 are fed a value of $\alpha$ and $1-\alpha$, where $\alpha$ is set to a very small value associated with forming a 'leaky bucket' filtering arrangement. As such, at an output channel 412 from the leaky bucket filter there is formed an average power value, which is used as an input to a final multiplier 414, a second input of which is applied a user set parameter 416. The averaged power output from the leaky bucket filter on channel 412 is therefore multiplied by the user set parameter which adapts the rate at which an adaptive threshold is changed, which is formed at the output of the final multiplier 414. The adaptive threshold is fed from the output 418 to a peak correlation threshold detector 420 which is also shown in FIG. 15. The peak correlation detector 420 receives the I and Q components from the output of the correlator on an input channel 422, an absolute magnitude samples at the output of the magnitude former 400 on a channel 424 and the adaptive threshold via the input channel 418.

Thus according to the above description in order to set up the adaptive threshold, a signal which is proportional to a long-term average power is generated. The magnitude of the 'I' and 'Q' signals, coming out of the correlator from the final multiplier 308 are added together to provide the signal power approximation, 'abs_D', and a leaky bucket filter averages these values. The threshold is formed from a scaled up version of the average signal power and optionally the up-scaling is controlled by a user-defined register 'P1ThresholdAdj'.

The final stage of the algorithm compares the instantaneous signal power, 'abs_D', with the adaptive threshold (derived from long-term average signal power, 'abs_D_avg'). The peak detection kicks in only at the point when 'abs_D' exceeds the adaptive threshold. The detected peak is the point at which the value of the current 'abs_D' falls below its previous highest recorded value i.e. when there is a slope change in the instantaneous signal power.

A further enhancement of the peak-picking algorithm is made to minimize the false peak detection. The peak detection is based on slope changes of the correlation magnitude and this scheme picks up global maxima and not the local maxima due to quantization of the intermediate signals.

A smaller moving averaging filter 402, of three-samples long, is added to smooth out small transitions of the correlation magnitude. FIG. 16 shows the effect of using this further moving averaging filter which averages over T=3 samples 420. This ensures that only global maxima are picked and thus increasing the accuracy of the peak-detection algorithm. Essentially, as a result of variations in the output of the correlator, it is possible for a detector to identify a false peak ahead of the true peak. This is illustrated in FIG. 16 by a plot of the output of the correlator without the moving averaging filter 420 shown as plot 500 and with the moving averaging filter 502. There is a possibility of the detected peak position to be different from the actual peak by +/−1 sample as a result but this is a small penalty compared to bigger errors incurred if not implementing this enhancement.

Illustration of Operation

Figure 19:
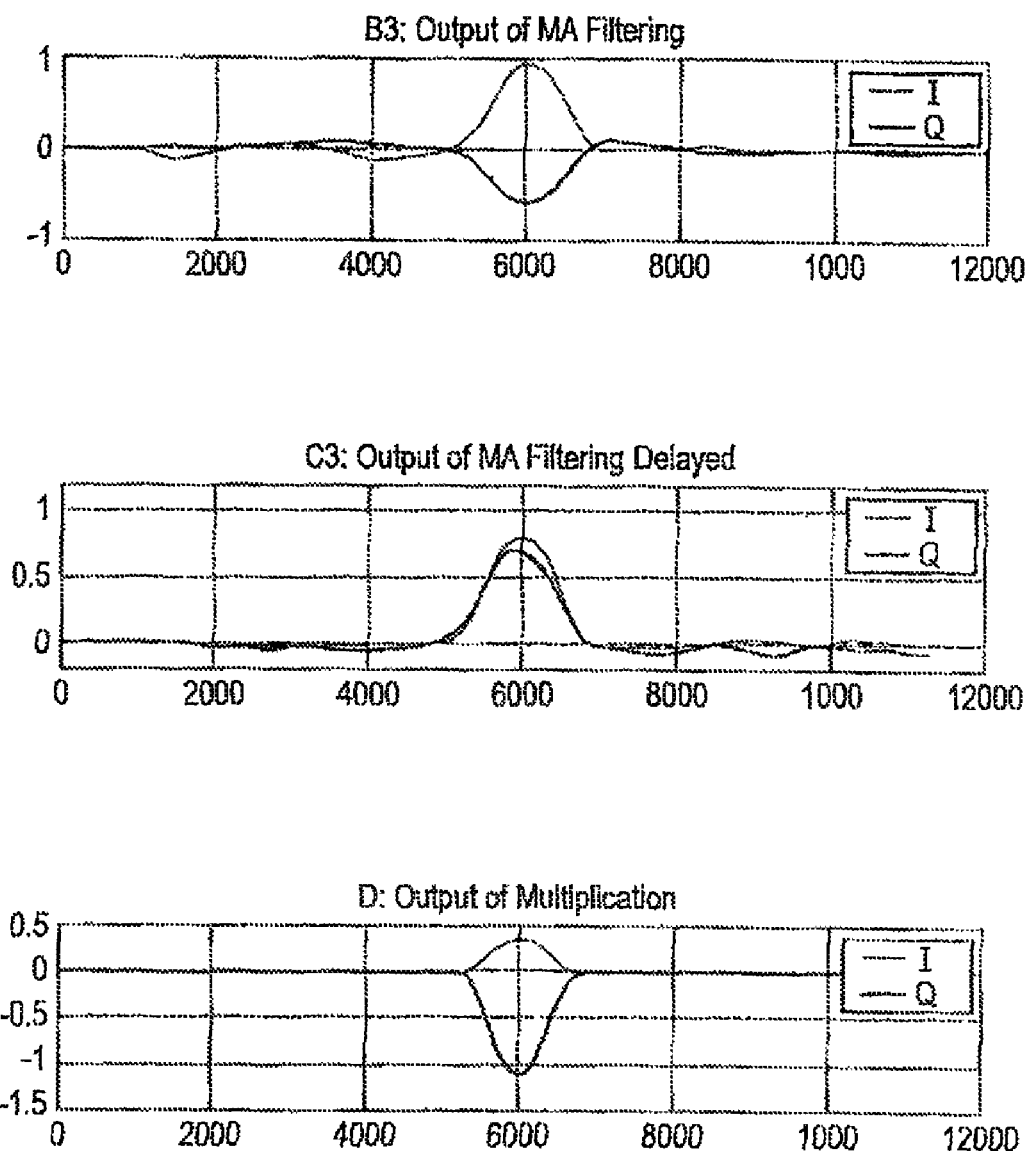
FIG. 19 shows a snapshot of a graphical plot of signal values with respect to time for the output of a correlator.

An effect of the guard and signalling detector utilising the correlator circuit shown in FIGS. 11, 14 and 15 is illustrated by example plots of results provided in FIGS. 17, 18, 19, 20, 21 and 22, which show intermediate signals for a 'single-path' channel with SNR=33 dB and FFT size of 1K. Effectively the post processor 320 shown in FIGS. 11 and 14, 15 has an effect of adapting the detection threshold for identifying the optimum sampling point for the detection of the P1 symbol. The plots shown in FIGS. 17, 18 and 19 are labelled at corresponding points from the correlator circuit shown in FIG. 11, namely C1, C2, C3, B1, B2, B3 and D.

FIGS. 17 and 18 show plots of signal values with respect to the number of those signal samples for the C and the B branches. As can be seen, the effects of the second moving averaging filter 312, 314 is to produce a more defined peak and therefore increase a likelihood of correctly identifying the sensor of the P1 symbol.

FIG. 19 shows the effect of the correlator by introducing the further moving averaging filter adapted in accordance with a temporal period of the guard interval for the opposite branch. As can be shown by plot B3 and C3, the effect is to cause the correlation results to be further refined so that when multiplying these results together, the output forms a defined peak as shown for the final plot D.

Figure 20:
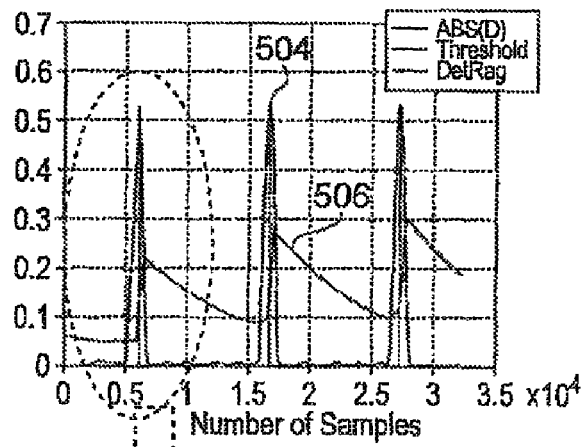
FIG. 20 is an example plot of signal amplitude with respect to time at the output of the correlator and also the threshold value generated by the adaptive threshold processor within the post processing function shown in FIG. 14.
Figure 21:
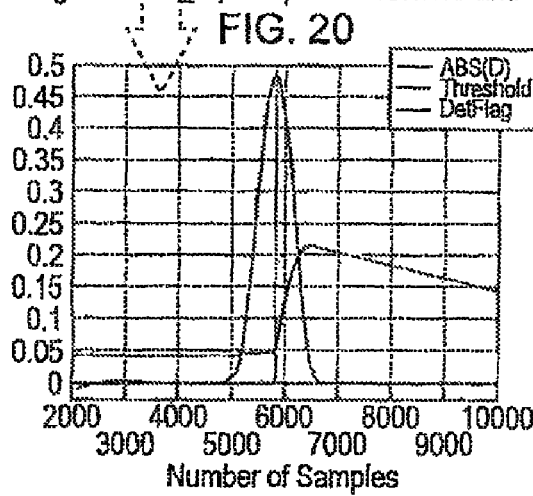
FIG. 21 is an example plot of signal amplitude against time of discrete time samples providing an expanded view of a section of the plot shown in FIG. 20.
Figure 22:
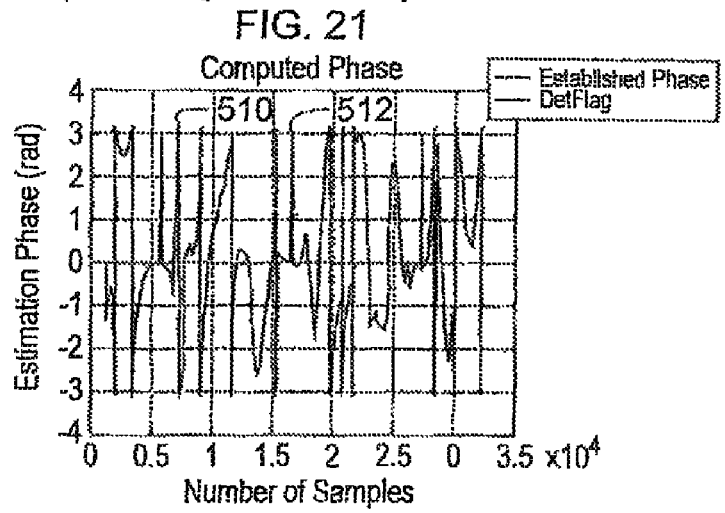
FIG. 22 is an example plot of phase or argument of the output of the correlator for an example test case with respect to a number of samples for a single path with an illustration of a detection flag for the P1 symbol.

FIGS. 20, 21 and 22 provide an illustration of the operation of the post processor and detection processor 320. As shown in FIG. 20, a plot showing the output from the correlator on channel 422 after the absolute magnitude processor 400 which is applied on channel 424. The plot 504 shown in FIG. 20 illustrates a series of peaks corresponding to the output of the correlation, the peak value of which corresponds to the optimum sampling point. Also shown in FIG. 20 is an adaptive threshold value 506 which is output on channel 418 to the peak detector 420. Thus as can be seen, the threshold value is adapted in accordance with the absolute value D from the correlator with the effect that the peak value of the absolute value D is more likely to be correctly detected.

Correspondingly, the estimated phase for the fine frequency offset is also identified from possible values by identifying the value corresponding to the point at which the detection flag is raised. In FIG. 22 this is illustrated by a plot of phase in radians against samples 510 with the peak detection flag shown at 512.

Simulation Results

A long simulation analysis of over 100 iterations with three P1 symbols per iteration of the synchronization and detector according to the present technique were run to establish the reliability in terms of 'pass rate' of correctly detecting the P1 symbol. Four other parameters were also computed, which were:

1. mean value of estimated phase error (radians);
2. standard deviation (std) of estimated phase error (radians);
3. mean value of P1 position error with respect to the end of P1 symbol (samples);
4. standard deviation of P1 position error (samples).

The simulation parameters were as follows:

1. FFT Size: '8 k' as an example, although comprehensive evaluations have been performed for all 6 possible FFT sizes;
2. Guard Interval: '0'
3. Channel Type: scanned all three channels—{'0': single path, '1': 2-path, '2': 3-path};
4. SNR: when evaluating AWGN performance, scan low and high SNR values {−6 to 33 dB} when evaluating CWI performance, fixed to be 33 dB;
5. Frequency Offset: fixed to be {2000 Hz};
6. Carrier-to-CW Interference Ratio; when evaluating AWGN performance, fixed to be 700 dB (effectively disabling CWI); when evaluating CWI performance, scanning high and low values of CW interference {−6 to 33 dB};
7. Number of Iterations: fixed to be 100 i.e. total number of P1 symbols detected=300.

In order to be able to plot results for all iterations, some fictitious values are assigned to the following parameters whenever the pass-rate for detecting the P1 symbol falls to zero percent.

Mean Estimated P1 Position Error=1000
Mean Estimated Phase=4 rad
Mean Estimated Phase Error=4 rad.

The reader should bear this information in mind, when examining the results depicted in the following FIGS. 23 to 31.

Figure 23:
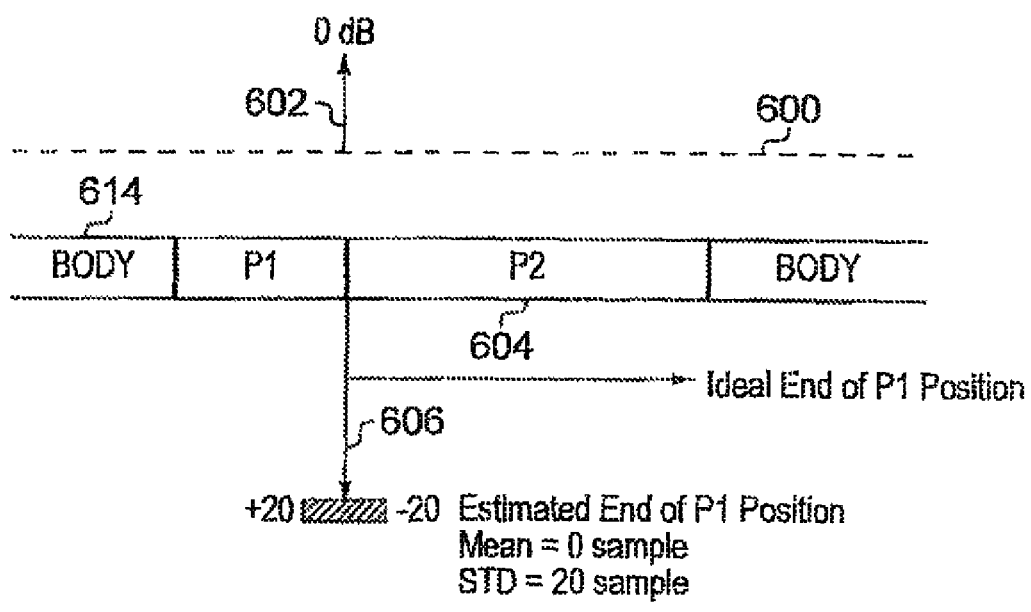
FIG. 23 is a schematic representation of a P1 symbol within a superframe of a DVB-T2 transport stream illustrated with respect to a channel impulse response for a single path channel.
Figure 24A:
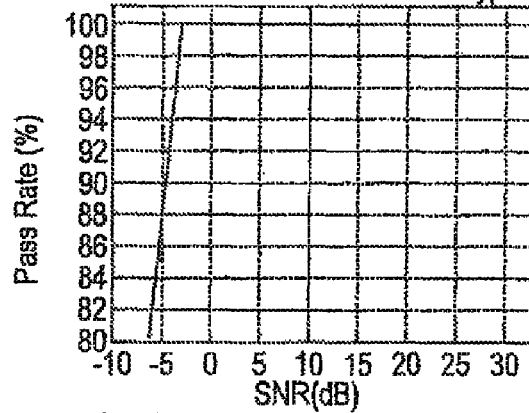
FIG. 24a provides an example plot of a pass rate for correctly detecting a P1 symbol against signal to noise ratio for a single path channel.
Figure 24B:
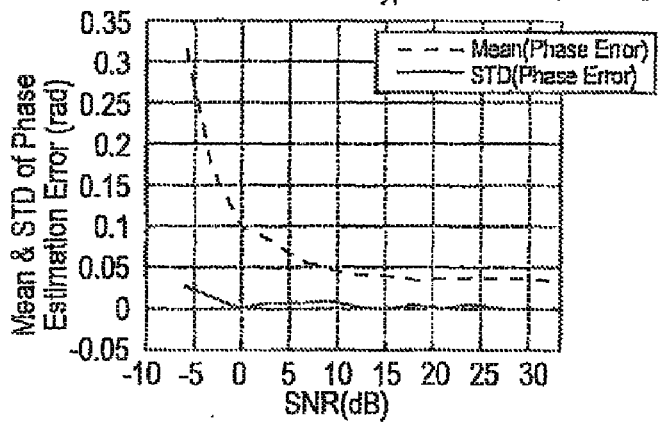
FIG. 24b is an example plot of an estimation of phase error with respect to the detection of the fine frequency offset provided with the P1 symbol for a single path channel.

FIG. 23 provides an illustrative representation of the single path channel which has been used to confirm by simulation the operation of the P1 detection process performed by the guard and signalling detector 106. In FIG. 23 a channel impulse response 600 is shown to provide a single path 602 of 0 dB. An effect of the OFDM symbol stream is illustrated by a schematic representation of the symbols 604 with the optimum detection of the P1 symbol shown at a point 606. As illustrated the mean value of the detection should be at zero sample with a standard deviation of plus or minus 20 samples. Results for the channel shown in FIG. 23 are provided in FIGS. 24a, 24b and 24c. FIG. 24a provides a plot of a correct detection of the P1 symbol with respect to signal to noise ratio for a channel's interference ratio of 700 dBs. FIG. 24b provides an illustration of a plot of mean and standard deviation of a phase estimation error for detecting a correct value of the find frequency offset, whereas FIG. 24c shows a plot of position estimation for the single path chain of FIG. 23 for both mean and standard deviation, providing an illustration of the error between the detecting position of the P1 symbol and the actual position.

Figure 25:
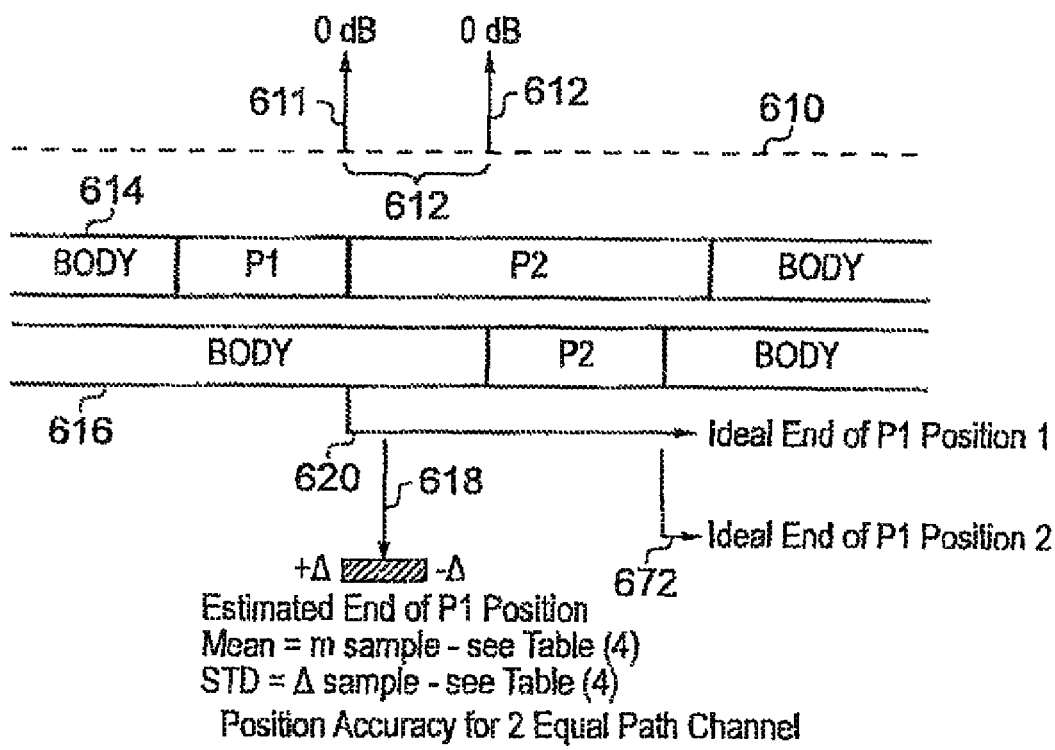
FIG. 25 is a schematic representation of a symbol stream showing the P1 symbol of the DVB-T2 transmission stream illustrating a representation of a position accuracy for a two path channel.

FIG. 25 represents an illustration corresponding to that shown in FIG. 23 but for a two path channel. Thus an impulse response of the channel 610 is shown to include two 0 dB paths 612. An effect of the two paths is illustrated by two sample symbol streams 614, 616. The estimated end of the P1 symbol is shown as position 618 with an ideal position for the first path 611 shown at point 620, and an ideal position for the second path shown at position 622. For this example it is assumed that the ideal position is at the end of the first position.

Figure 24C:
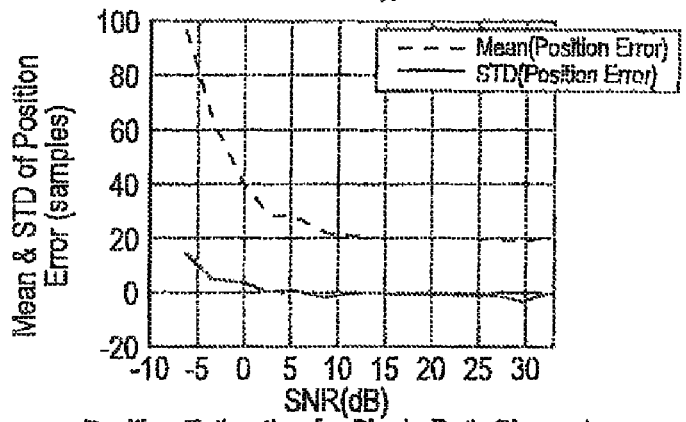
FIG. 24c provides an example plot of mean and standard deviation for position error for the detection of the P1 symbol with respect to signal to noise ratio for a single path channel illustrated in FIG. 23.
Figure 26A:
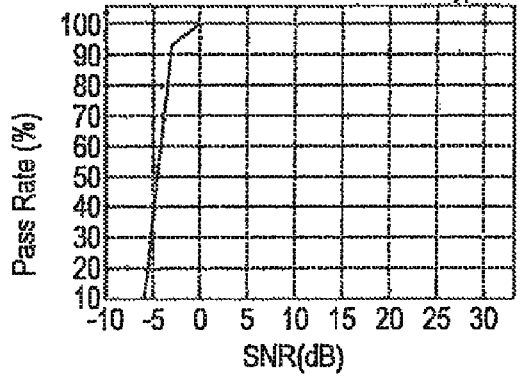
FIGS. 26a, 26b, 26c provide corresponding representations to those shown in FIGS. 24a, 24b, 24c for a two path channel.
Figure 26B:
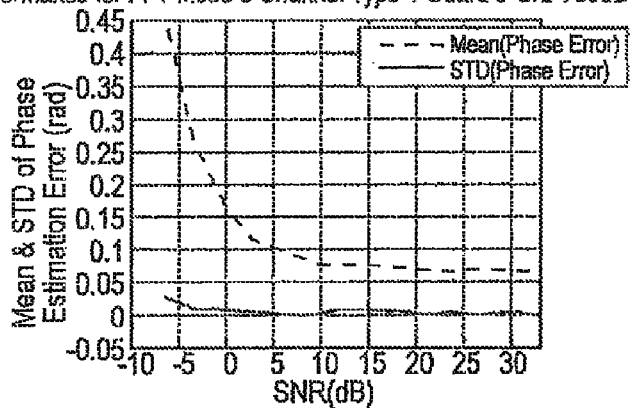
Figure 26C:
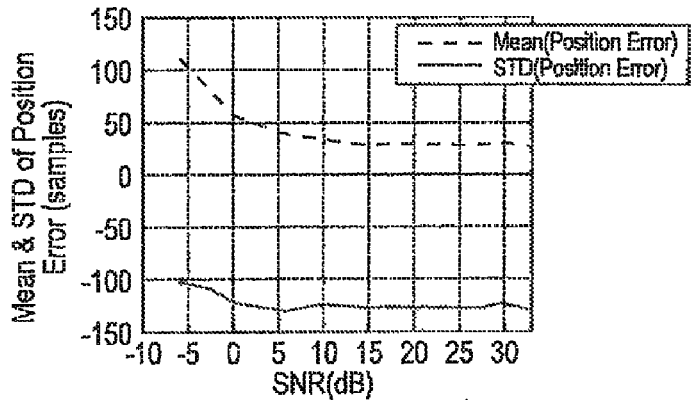

Results corresponding to those shown in FIGS. 24a, 24b and 24c are shown in FIGS. 26a, 26b, 26c for the two path channel, against signal to noise ratio for a carrier to interference ratio of 700 dBs.

TABLE 4

P1 Position Error Accuracy for All Possible FFT Modes (2-path channel)

| FFT Mode | Mean of Position Error {M} (samples) | STD of Position Error {Δ} (samples) |
| --- | --- | --- |
| 1K | −15 | 30 |
| 2K | −35 | 30 |
| 4K | −60 | 30 |
| 8K | −125 | 30 |
| 16K | 25 | 250 |
| 32K | −125 | 25 |

Figure 27:
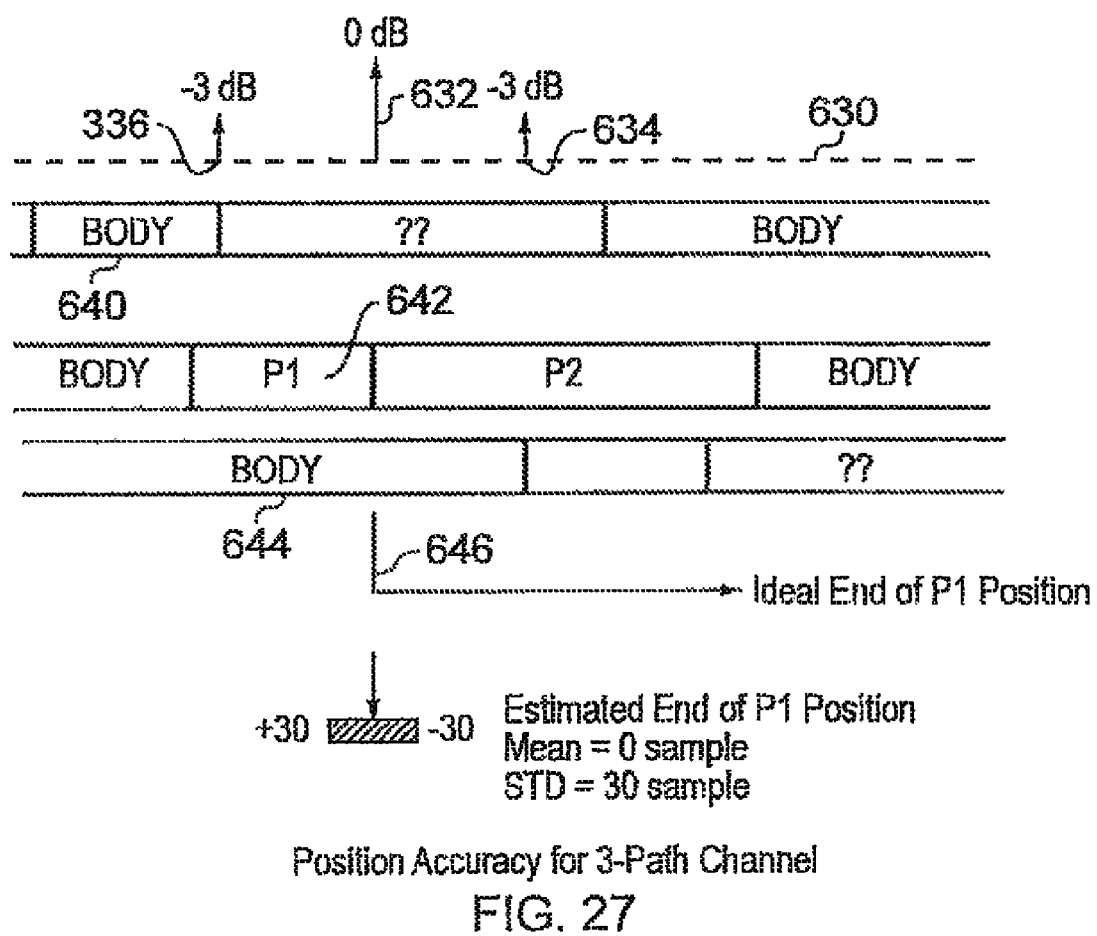
FIG. 27 is a schematic representation illustrating a DVB-T2 symbol stream including the P1 and P2 symbols shown with respect to channel impulse response including a three path channel.

FIG. 27 provides an illustrative representation of a three path channel corresponding to the single path and two path channels shown in FIGS. 23 and 25. In FIG. 27, a channel impulse response 630 has a 0 dB path at position 632 and two paths at position 634, 636. A representation of the channel impulse response on the DVB-T2 stream is shown as a representation of the super-frame with corresponding delays as representations 640, 642, 644. Again a position of the synchronisation point generated from the P1 symbol is shown as a position 646. Results for the three path channel corresponding to those shown in FIGS. 24a, 24b, 24c and 26a, 26b, 26c are shown in 28a, 28b, 28c.

Figure 28A:
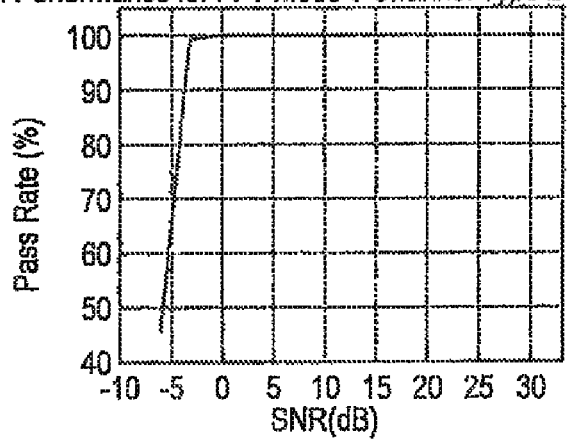
FIGS. 28a, 28b, 28c provide graphical plots corresponding to those shown in FIGS. 24a, 24b, 24c for the three path channel illustrated in FIG. 27.
Figure 28B:
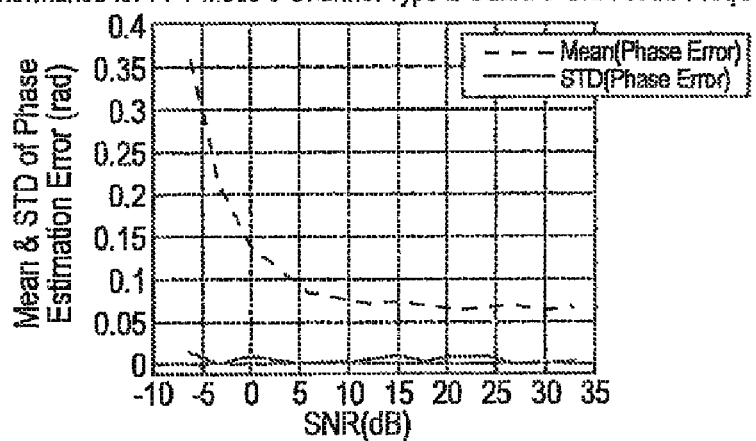
Figure 28C:
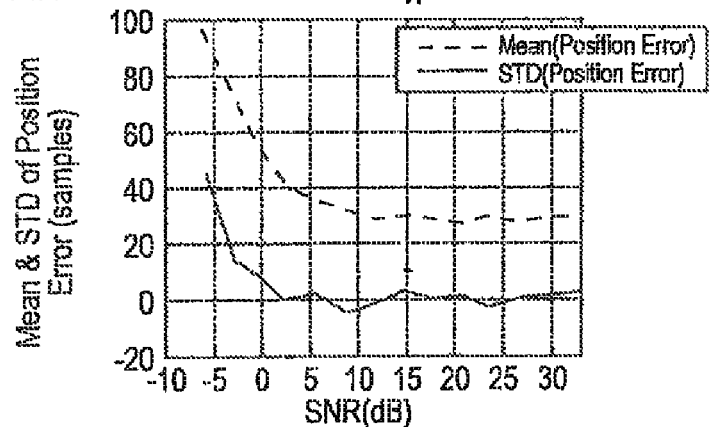
Figure 29A:
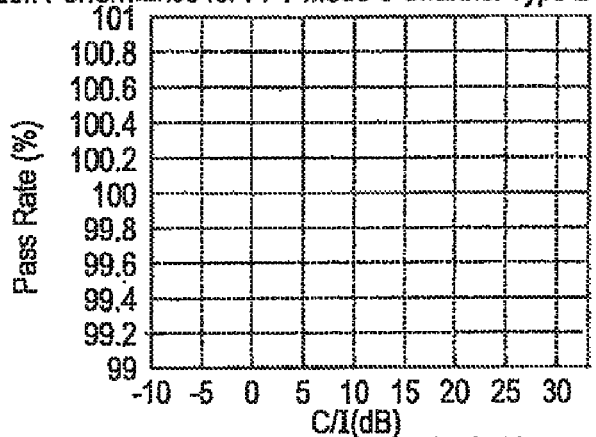
FIGS. 29a, 29b, 29c show corresponding plots to those shown in FIGS. 24a, 24b, 24c for a signal to noise ratio of 33 dBs for a single path channel.
Figure 29B:
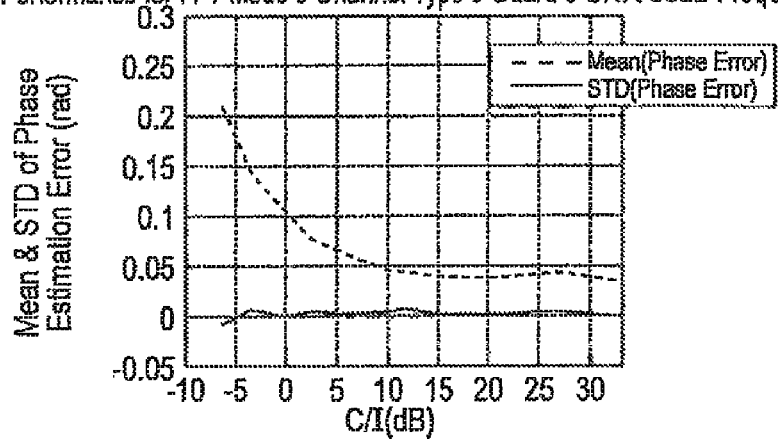
Figure 29C:
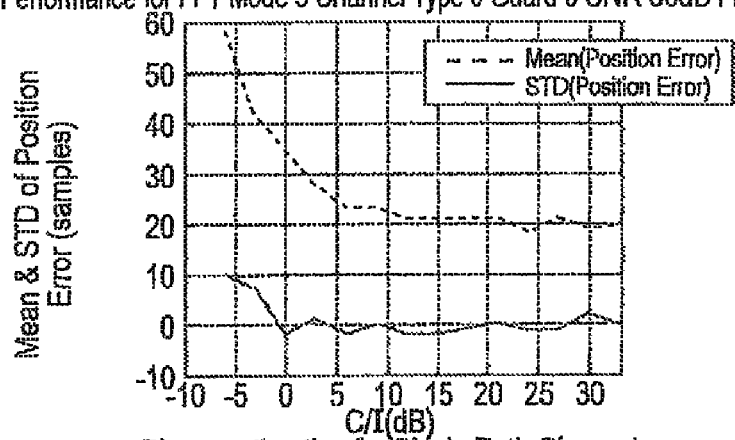
Figure 30A:
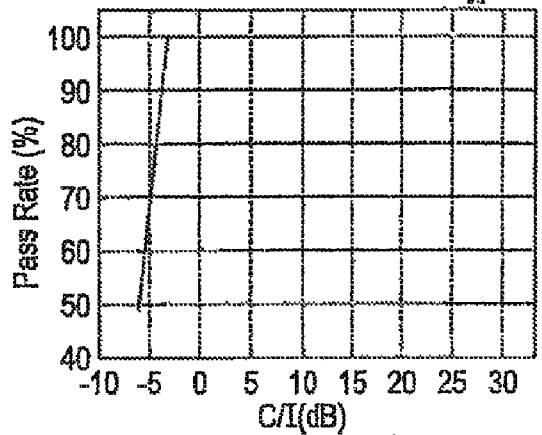
FIGS. 30a, 30b and 30c provide corresponding plots to those shown in FIGS. 24a, 24b, 24c for a two path channel.
Figure 30B:
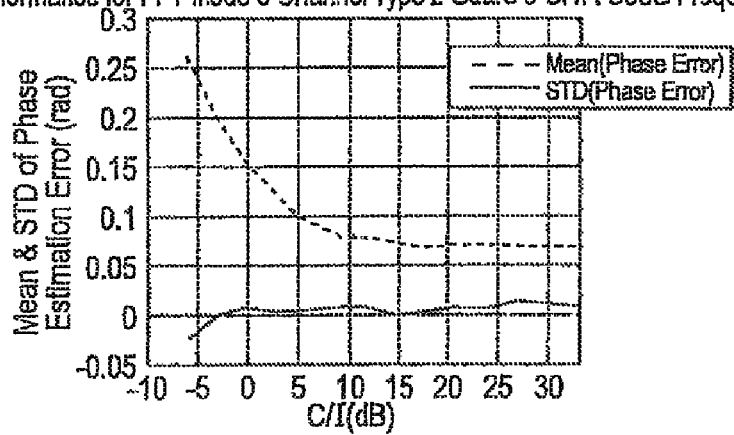
Figure 30C:
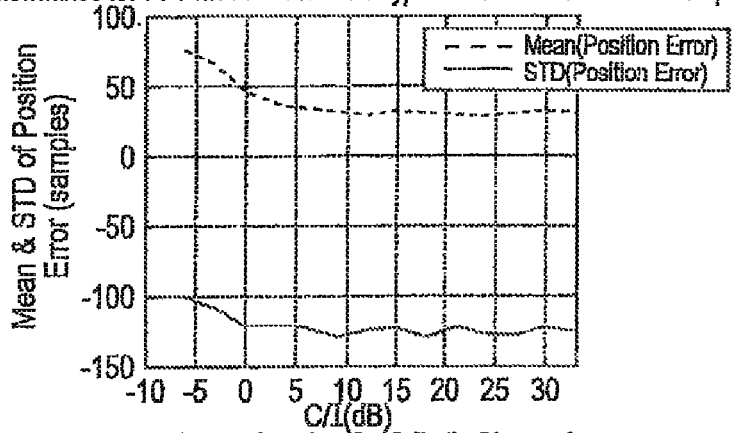
Figure 31A:
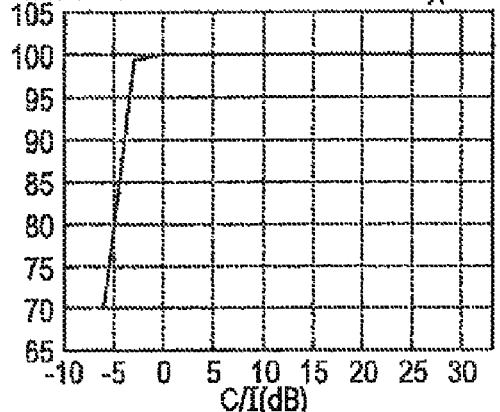
FIGS. 31a, 31b, 31c show corresponding plots to those shown in FIGS. 29a, 29b, 29c for a three path channel.
Figure 31B:
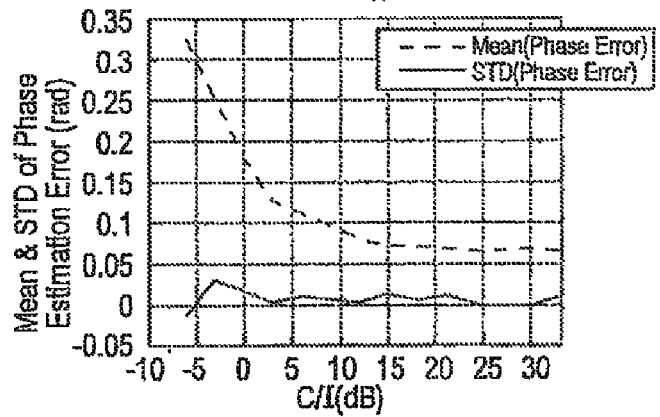
Figure 31C:
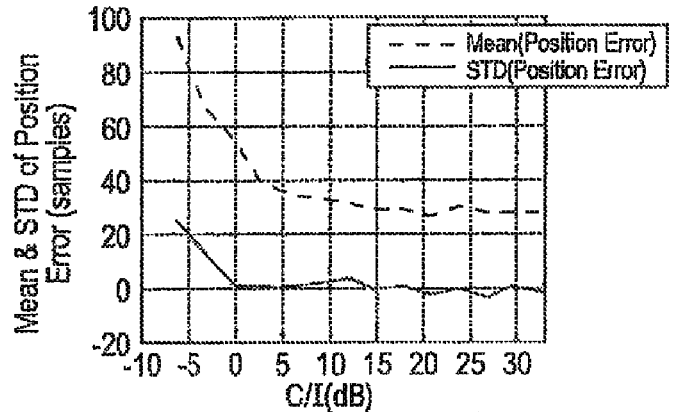

The results shown in FIGS. 24, 26 and 28 have been repeated for a variation in carrier to interference ratio for signal to noise ratio set at 33 dBs for the single path, the two path and the three path channel as illustrated in FIGS. 29a, 29b, 29c, 30a, 30b, 30c, 31a, 31b and 31c respectively.

As will be appreciated the transmitter and receiver shown in FIGS. 1 and 3 respectively are provided as illustrations only and are not intended to be limiting. For example, it will be appreciated that the present technique can be applied to different transmitter and receiver architectures.

The present technique for detecting the P1 symbol also finds application with any communication system which utilises OFDM to communicate data. Moreover the present technique for detecting P1 symbols can be used in combination with a technique for detecting the guard interval without decoding signalling information which is provided in subsequent signalling information, such as that disclosed in our co-pending UK patent application GB0909583.7, the contents of which are incorporated herein by reference, particularly the blind guard detection technique.

As mentioned above, embodiments of the present invention find application with DVB standards such as DVB-T, DVB-T2, DVB-C2 and DVB-H, which are incorporated herein by reference. For example embodiments of the present invention may be used in a transmitter or receiver operating in accordance with the DVB-H standard, in hand-held mobile terminals. Services that may be provided may include voice, messaging, internet browsing, radio, still and/or moving video images, television services, interactive services, video or near-video on demand and option. The services might operate in combination with one another. In other examples embodiments of the present invention finds application with the DVB-T2 standard as specified in accordance with ETSI standard EN 302 755. In other examples embodiments of the present invention find application with the cable transmission standard known as DVB-C2. For the example of DVB-C2, it will be appreciated that the OFDM symbols are not transmitted and received via a radio frequency carrier, but via cable and so an appropriate adaptation of the transmitter and receiver architecture can be made. However, it will be appreciated that the present invention is not limited to application with DVB and may be extended to other standards for transmission or reception, both fixed and mobile.

The invention claimed is:

1. A receiver for detecting and recovering data from Orthogonal Frequency Division Multiplexed (OFDM) symbols, the OFDM symbols including within a repeating time frame a signalling OFDM symbol and one or more data bearing OFDM symbols, the signalling OFDM symbol including a pre-amble guard interval and a post-amble guard interval, the pre-amble and the post-amble guard intervals being formed by copying samples from a useful part of the signalling OFDM symbol in the time domain, the receiver comprising a demodulator which is arranged in operation to detect a signal representing the OFDM symbols, and to generate a sampled version of the OFDM symbols in the time domain, a signalling and guard detector, which includes a correlator comprising a first branch which forms pre-amble correlated samples from the pre-amble of the signalling OFDM symbol, and includes a first moving averaging filter, which is arranged to form pre-amble average correlated samples by averaging a value of a plurality of the pre-amble correlated samples within a moving window, the plurality of pre-amble correlated samples averaged within the moving window corresponding to a temporal length of the post-amble (Tb), a second branch which forms post-amble correlated samples from the post-amble of the signalling OFDM symbol, and includes a second moving averaging filter, which is arranged to form post-amble average correlated samples by averaging a value of a plurality of the post-amble correlated samples within a moving window, the plurality of post-amble correlated samples averaged within the moving window corresponding to a temporal length of the pre-amble (Tc), a combiner, which is arranged to combine the averaged pre-amble correlated samples and the averaged post-amble correlated samples to form output correlation samples, and a post processing detector which is arranged to detect the signalling OFDM symbol from the output correlation samples to identify a timing of the frame from which the data bearing OFDM symbols can be identified.

2. A receiver as claimed in claim 1, wherein the post processing detector is arranged in operation to detect the signalling OFDM symbol by comparing the correlation output samples with a threshold value to identify a peak value of the output correlation value, and to adapt the value of the threshold in accordance with previously received output correlation samples.

3. A receiver as claimed in claim 2, wherein the post processing detector includes a filter, which is arranged to form an average value of the output correlation samples for a predetermined duration to form the adaptive threshold.

4. A receiver as claimed in claim 3, wherein the filter is a leaky bucket filter.

5. A receiver as claimed in claim 3, wherein the post processing detector includes a third moving averaging filter, which is arranged to receive the output correlation samples and to form average samples, by averaging the value of the output correlation samples within a predetermined window of a plurality of the output correlation samples, the averaged samples produced by the third moving averaging window being fed to the filter for forming the adaptive threshold.

6. A receiver as claimed in claim 1, wherein
the first and second branches of the correlator include a third and fourth moving averaging filter before the first and second moving averaging filters respectively, the third and fourth moving averaging filters each being arranged to form average samples from a plurality of the respective pre-amble and post-amble correlation samples within a moving window, the plurality of pre-amble and post-amble correlation samples corresponding to a temporal length of the window (TR) being such as to reduce continuous wave interference.

7. A receiver as claimed in claim 1, wherein
the first branch includes a first delay element which is arranged to delay a version of the samples of the OFDM symbols by an amount corresponding to a temporal length of the pre-amble (Tc), and a first multiplier, which is arranged to multiply the samples of the received OFDM symbols with the delayed samples of the OFDM symbols received from the first delay element, one of the multiplied samples being conjugated, to form the pre-amble correlation output samples, and
the second branch includes a second delay element which is arranged to delay a version of the samples of the OFDM symbols by an amount corresponding to a temporal length of the post-amble (Tb), and a second multiplier, which is arranged to multiply the samples of the received OFDM symbols with the delayed samples of the OFDM symbols from the second delay element, one of the multiplied samples being conjugated, to form the post-amble correlated samples.

8. A method of detecting and recovering data from Orthogonal Frequency Division Multiplexed (OFDM) symbols, the OFDM symbols including within a repeating time frame a signalling OFDM symbol and one or more data bearing OFDM symbols, the signalling OFDM symbol including a pre-amble guard interval and a post-amble guard interval, the pre-amble and the post-amble guard intervals being formed by copying samples from a useful part of the signalling OFDM symbol in the time domain, the method comprising detecting a signal representing the OFDM symbols,
generating a sampled version of the OFDM symbols in the time domain,
forming pre-amble correlated samples from the pre-amble of the signalling OFDM symbol,
forming pre-amble average correlated samples by averaging a value of a plurality of the pre-amble correlated samples within a moving window, the plurality of pre-amble correlated samples averaged within the moving window corresponding to a temporal length of the post-amble (Tb),
forming post-amble correlated samples from the post-amble of the signalling OFDM symbol,
forming post-amble average correlated samples by averaging a value of a plurality of the post-amble correlated samples within a moving window, the plurality of post-amble correlated samples averaged within the moving window corresponding to a temporal length of the pre-amble (Tc),
combining the averaged pre-amble correlated samples and the averaged post-amble correlated samples to form output correlation samples, and
detecting the signalling OFDM symbol from the output correlation samples to identify a timing of the frame from which the data bearing OFDM symbols can be identified.

9. A method as claimed in claim 8, wherein the detecting includes
comparing the correlation output samples with a threshold value to identify a peak value of the output correlation value, and
adapting the value of the threshold in accordance with previously received output correlation samples.

10. A method as claimed in claim 9, wherein the detecting includes
filtering with a filter, which is arranged to form an average value of the output correlation samples for a predetermined duration to form the adaptive threshold.

11. A method as claimed in claim 10, wherein the filter is a leaky bucket filter.

12. A method as claimed in claim 10, wherein the detecting includes
receiving the output correlation samples and
forming averaged samples of the output correlation samples, by averaging the value of the output correlation samples within a predetermined window of a plurality of the output correlation samples, the averaged output correlation samples produced by being filtered by the filter to form the adaptive threshold.

13. A method as claimed in claim 8, wherein the forming the pre-amble correlation samples includes filtering the pre-amble correlation samples before the forming the pre-amble average correlated samples, and the forming the post-amble correlation samples includes filtering the post-amble correlation samples before the forming the post-amble average correlated samples, the filtering each being arranged to form average samples from a plurality of the respective pre-amble and post-amble correlation samples within a moving window, the plurality of pre-amble and post-amble correlation samples corresponding to a temporal length of the window (TR) being such as to reduce continuous wave interference.

14. A receiving apparatus comprising a demodulator which is arranged in operation to detect a signal representing OFDM symbols, and to generate a sampled version of the OFDM symbols in the time domain, the OFDM symbols including within a repeating time frame a signalling OFDM symbol and one or more data bearing OFDM symbols, the signalling OFDM symbol including a pre-amble guard interval and a post-amble guard interval, the pre-amble and the post-amble guard intervals being formed by copying samples from a useful part of the signalling OFDM symbol in the time domain, a signalling and guard detector, which includes a correlator comprising a first branch which forms pre-amble correlated samples from the pre-amble of the signalling OFDM symbol, and includes a first moving averaging filter, which is arranged to form pre-amble average correlated samples by averaging a value of a plurality of the pre-amble correlated samples within a moving window, the plurality of pre-amble correlated samples averaged within the moving window corresponding to a temporal length of the post-amble (Tb), a second branch which forms post-amble correlated samples from the post-amble of the signalling OFDM symbol, and includes a second moving averaging filter, which is arranged to form post-amble average correlated samples by averaging a value of a plurality of the post-amble correlated samples within a moving window, the plurality of post-amble correlated samples averaged within the moving window corresponding to a temporal length of the pre-amble (Tc), a combiner, which is arranged to combine the averaged pre-amble correlated samples and the averaged post-amble correlated samples to form output correlation samples, and a post processing detector which is arranged to detect the signalling OFDM symbol from the output correlation samples to identify a timing of the frame from which the data bearing OFDM symbols can be identified.

15. A receiver as claimed in claim 14, wherein the combiner includes a delay element for delaying the pre-amble averaged correlated samples by an amount corresponding to the useful part of the signalling OFDM symbol and a multiplier, which multiplies the delayed pre-amble averaged correlated sampled and the post-amble averaged correlated samples.

16. A receiver as claimed in claim 14, wherein the OFDM symbols are formed in accordance with the DVB-T2 standard and the signalling OFDM symbol is a P1 symbol.

17. A receiver as claimed in claim 14, wherein the OFDM symbols are formed in accordance with the DVB-T2 standard and the signalling OFDM symbol is a P1 symbol.

18. A receiver as claimed in claim 14, wherein the receiver is a television receiver.

19. A receiver as claimed in claim 1, wherein the OFDM symbols are formed in accordance with the DVB-T2 standard and the signalling OFDM symbol is a P1 symbol.

20. A receiver as claimed in claim 1, wherein the receiver is a television receiver.

* * * * *